(12) United States Patent
Suzuki et al.

(10) Patent No.: US 10,994,772 B2
(45) Date of Patent: May 4, 2021

(54) VEHICLE POWER STEERING SYSTEM

(71) Applicant: DENSO CORPORATION, Kariya (JP)

(72) Inventors: Takashi Suzuki, Kariya (JP); Shuji Kuramitsu, Kariya (JP); Nobuyori Nakajima, Kariya (JP); Go Endoh, Kariya (JP); Haruo Suzuki, Kariya (JP); Koichi Nakamura, Kariya (JP); Yosuke Ogi, Kariya (JP); Atsuko Oka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/702,912

(22) Filed: Dec. 4, 2019

(65) Prior Publication Data
US 2020/0180685 A1 Jun. 11, 2020

(30) Foreign Application Priority Data

Dec. 7, 2018 (JP) .............................. JP2018-230365

(51) Int. Cl.
*H02P 6/22* (2006.01)
*B62D 5/04* (2006.01)
*B62D 6/00* (2006.01)
*B62D 15/02* (2006.01)

(52) U.S. Cl.
CPC ......... *B62D 5/0487* (2013.01); *B62D 5/0412* (2013.01); *B62D 5/0484* (2013.01); *B62D 6/002* (2013.01); *B62D 15/0215* (2013.01); *H02P 6/22* (2013.01)

(58) Field of Classification Search
CPC ..... H02P 6/22; H02P 29/024; B62D 15/0215; B62D 5/0487; B62D 5/0484; B62D 5/0412; B62D 5/049
See application file for complete search history.

(56) References Cited

U.S. PATENT DOCUMENTS

| 6,755,276 B2* | 6/2004 | Clephas | B62D 5/003 180/402 |
| 7,222,008 B2* | 5/2007 | Takahashi | B62D 5/003 180/443 |
| 2014/0360803 A1* | 12/2014 | Hori | G01L 5/221 180/446 |
| 2015/0246683 A1* | 9/2015 | Kuramochi | B62D 5/0487 701/43 |

(Continued)

FOREIGN PATENT DOCUMENTS

| JP | 2016-000545 A | 1/2016 |
| WO | 2017/022006 A1 | 2/2017 |

*Primary Examiner* — Rina I Duda
(74) *Attorney, Agent, or Firm* — Maschoff Brennan

(57) ABSTRACT

A steering system in a vehicle includes a plurality of subsystems provided with a control unit. The control unit includes a storage unit storing steer angle information regarding a steer angle of one of a steering mechanism and a steered mechanism when the steering mechanism or the steered mechanism stops, an abnormality determiner determining abnormality of the motor rotation detection value and the detection circuit in the plurality of subsystems at a start time of a motor based on a comparison of at least two parameters, and a steer angle calculator calculating the steer angle based on the parameters having been determined by the abnormality determiner as not abnormal.

8 Claims, 15 Drawing Sheets

(56) References Cited

U.S. PATENT DOCUMENTS

| | | | |
|---|---|---|---|
| 2015/0253773 A1* | 9/2015 | Cox | B64C 25/405 |
| | | | 701/3 |
| 2016/0043670 A1* | 2/2016 | Nakamura | H02P 29/032 |
| | | | 318/400.17 |
| 2018/0208235 A1 | 7/2018 | Miyashita | |

* cited by examiner

VEHICLE POWER STEERING SYSTEM

CROSS REFERENCE TO RELATED APPLICATION

The present application is based on and claims the benefit of priority of Japanese Patent Application No. 2018-230365, filed on Dec. 7, 2018, the disclosure of which is incorporated herein by reference.

TECHNICAL FIELD

The present disclosure generally relates to a steering system that performs power steering by using a motor.

BACKGROUND INFORMATION

The related art discloses a technique related to diagnosis of a steer angle detection unit in a steering system that performs power steering by using a motor. In this technique, when a clutch device is in a connected state at an ignition OFF time of a vehicle, a steering angle involving a rotation of a steering wheel and a turning angle involving a tire orientation, which includes the way a tire is oriented, respectively detected by the steer angle detection unit are stored. Then, the steer angle detection unit may be considered as abnormal if the steering angle and the turning angle detected at a next start time (e.g., ignition ON time) of the vehicle does not match with a relationship between the steering angle and the turning angle stored at a previous start time.

In order to perform power steering by using a motor, calculation accuracy of a steer angle including a steering angle of a steering wheel and a turning angle of a front wheel, for example, needs to be guaranteed for matching of the steering angle with the turning angle.

On the other hand, when it is determined that an angle sensor is abnormal and the steer angle (i.e., either the steering angle or the turning angle) cannot be calculated, there is a concern that the motor control is hindered. That is, a redundant configuration is required for the calculation of the steer angle (i.e., for the calculation of the steering angle and/or the turning angle).

SUMMARY

It is an object of the present disclosure to provide a technique capable of calculating a steer angle while securing calculation accuracy and redundancy in a steering system that performs power steering by using a motor.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
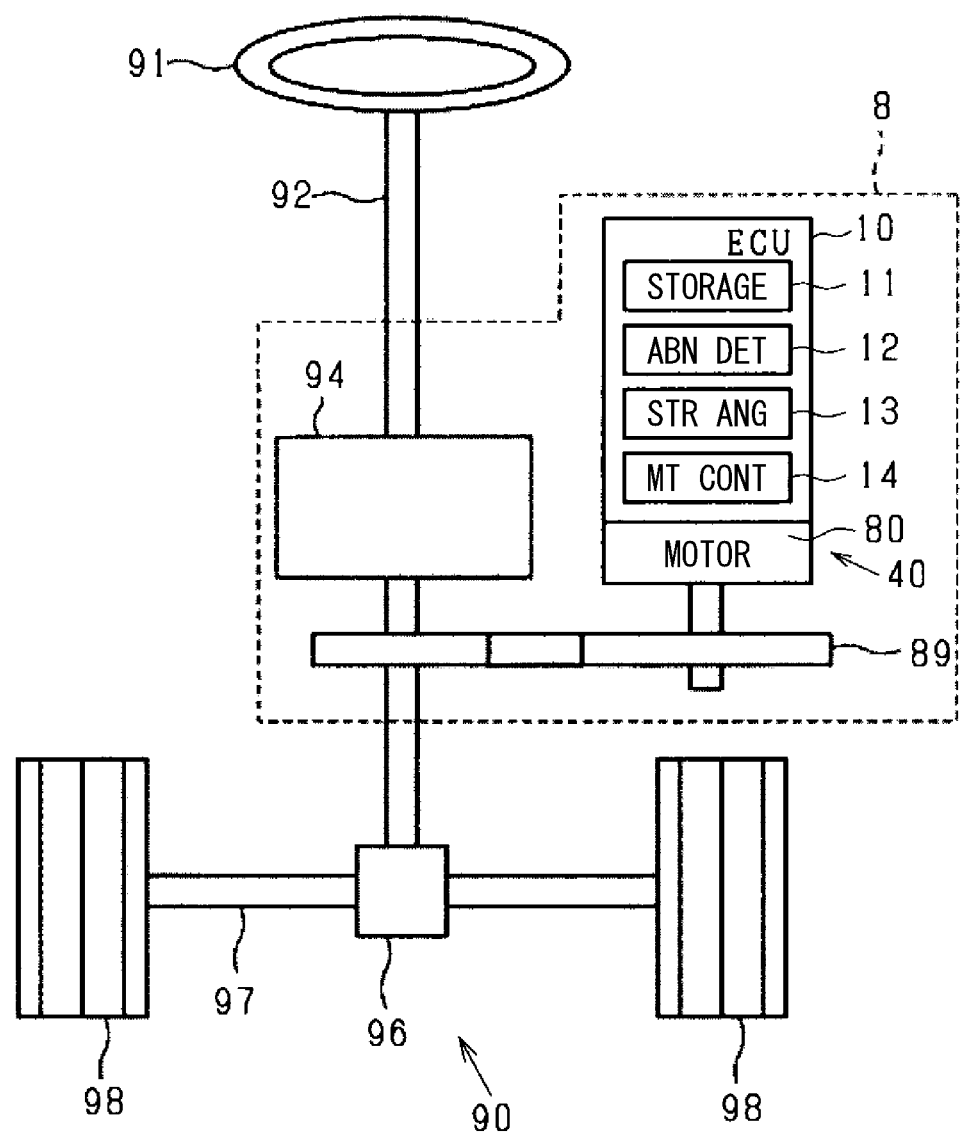
FIG. 1 is a schematic configuration diagram of a steering system according to a first embodiment of the present disclosure.
Figure 2:
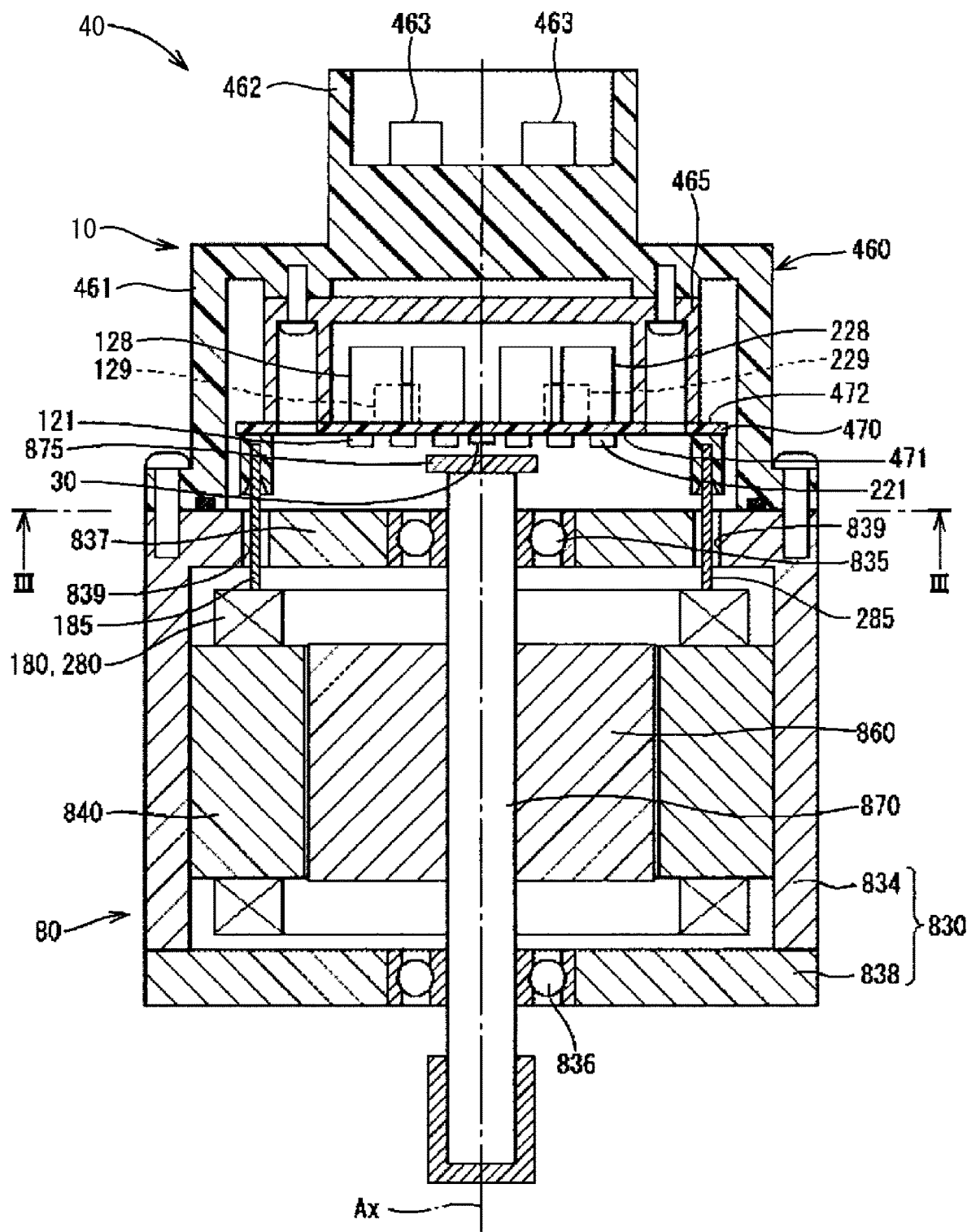
FIG. 2 is a cross-sectional view of a drive device according to the first embodiment of the present disclosure.

In the following embodiments, same or similar structural configurations are designated with the same reference numerals thereby to simplify the description thereof.

First Embodiment

As shown in FIG. 1, a steering system 90 of a vehicle includes a steering wheel 91 which is a steering member, a steering shaft 92, a pinion gear 96, a rack shaft 97, wheels 98, a steering device 8 and the like. The steering device 8 is an electric power steering device for assisting the steering operation of the vehicle.

The steering wheel 91 is connected to the steering shaft 92. The steering shaft 92 is provided with a torque sensor 94 for detecting a steering torque Ts. The pinion gear 96 is provided at an axial end of the steering shaft 92. The pinion gear 96 engages with the rack shaft 97. A pair of wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of wheels 98 is steered to an angle corresponding to the displacement amount of the rack shaft 97.

The steering device 8 includes a drive device 40 having a motor 80 and an ECU 10 (i.e., electronic control unit), and a speed reduction gear 89 as a power transmission unit that decelerates the rotation of the motor 80 and transmits it to the steering shaft 92. The motor 80 is a so-called steering control assist motor, and the drive device 40 is a so-called mechanism-controller integrated type drive device in which the ECU 10 and the motor 80 are integrated to form one body.

The motor 80 outputs an assist torque for assisting the steering of the steering wheel 91 by the driver, and is driven by an electric power supplied from power sources 191 and 291 (see FIG. 4), and rotates the speed reduction gear 89 forward and backward. The motor 80 is a three-phase brushless motor, and has a rotor 860 and a stator 840 (see FIG. 4).

The motor 80 has a first motor winding 180 and a second motor winding 280 respectively as a winding set. The motor windings 180 and 280 have the same electrical characteristics, and are wound around the stator 840 with their electrical angles shifted from each other by 30 degrees. Correspondingly, phase currents are controlled to be supplied to the motor windings 180 and 280 such that the phase currents have a phase difference $\varphi$ of 30 degrees. By optimizing a current supply phase difference, the output torque is improved. Further, it is possible to reduce a sixth-order torque ripple. Furthermore, it is possible to maximize advantages of cancellation of noise and vibration since the electric current is smoothed by the current supply with phase difference. Further, since heat generation is also averaged among the winding sets, temperature-dependent intersystem errors such as detection values of sensors and torques can be reduced, and a suppliable amount of electric current is also averaged.

The steering shaft 92 corresponds to a steering mechanism, and the steering mechanism is driven by the drive device 40. The rack shaft 97 corresponds to a steered mechanism. The ECU 10 corresponds to a control unit that controls the drive device 40.

In the drive device 40, the ECU 10 is integrally provided on one side in an axial direction of the motor 80 in a mechanism-controller integrated type device. Alternatively, the motor 80 and the ECU 10 may be provided separately. The ECU 10 is positioned coaxially with an axis Ax of a shaft 870 on one side opposite to an output shaft of the motor 80. The ECU 10 may alternatively be provided on the output shaft side of the motor 80. By adopting the mechanism-controller integrated type configuration, an efficient installation of the ECU 10 and the motor 80 in a restricted installation space of the vehicle is enabled.

The drive device 40 includes the motor 80 as a rotating electric machine, two detection circuits 130 and 230 for detecting the rotation of the motor 80, and two power sources 191 and 291 for supplying electric power to the two detection circuits 130 and 230.

Hereinafter, a combination of a first inverter 120, the first detection circuit 130, a first control unit 170 and the like related to a drive control of the first motor winding 180 is referred to as a first system L1, and a combination of a second inverter 220, the second detection circuit 230, a second control unit 270, and the like related to a drive control of the second motor winding 280 is referred to as a second system L2.

In each of the drawings, an upper side divided by a broken line is shown as the first system L1 and a lower side below the broken line is shown as the second system L2, except for a case where it is particularly mentioned.

Further, a configuration related to the first system L1 is basically indicated with reference numerals of 100s, and a configuration related to the second system L2 is basically indicated with reference numerals of 200s.

In the first system L1 and the second system L2, same or similar configuration is designated with same reference numeral in the least significant two digits. For the other configuration described below, the term "first" is indicated with a suffix "1," and the term "second" is indicated with a suffix "2."

The motor 80 includes, in addition to a stator 840 and a rotor 860, a housing 830 that houses the stator 840 and the rotor 860, and the like. The stator 840 is fixed to the housing 830 and the motor windings 180 and 280 are wound thereon. The rotor 860 is placed radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. The end portion of the shaft 870 on the ECU 10 side protrudes from the housing 830 toward the ECU 10. At an end of the shaft 870 on the ECU 10 side, a magnet 875 as a detection target is provided.

The housing 830 has a bottomed cylindrical case 834 including a rear end frame 837, and has a front end frame 838 placed on an open side of the case 834. The case 834 and the front end frame 838 are fastened to each other by bolts or the like. Lead wire insertion holes 839 are formed on the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a circuit board 470.

The ECU 10 includes a cover 460 and a heat sink 465 fixed to the cover 460 in addition to the circuit board 470 fixed to the heat sink 465. The ECU 10 further includes various electronic components and the like mounted on the circuit board 470.

The cover 460 protects the electronic components from external impacts and prevents dust, water or the like from entering into the ECU 10. The cover 460 consists of a cover main body 461 and a connector member 462 as an integrally-formed one body. The connector member 462 may be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at the end portion in the axial direction of the drive device 40 and is open on one side opposite to the motor 80.

The circuit board 470 is, for example, a printed circuit board, and is positioned to face the rear end frame 837. On the circuit board 470, the electronic components of the first and second systems are mounted independently for each system so that the two systems are provided in a fully redundant configuration. According to the present embodiment, the electronic components are mounted on one circuit board 47. The electronic components may alternatively be mounted on plural circuit boards.

Figure 3:
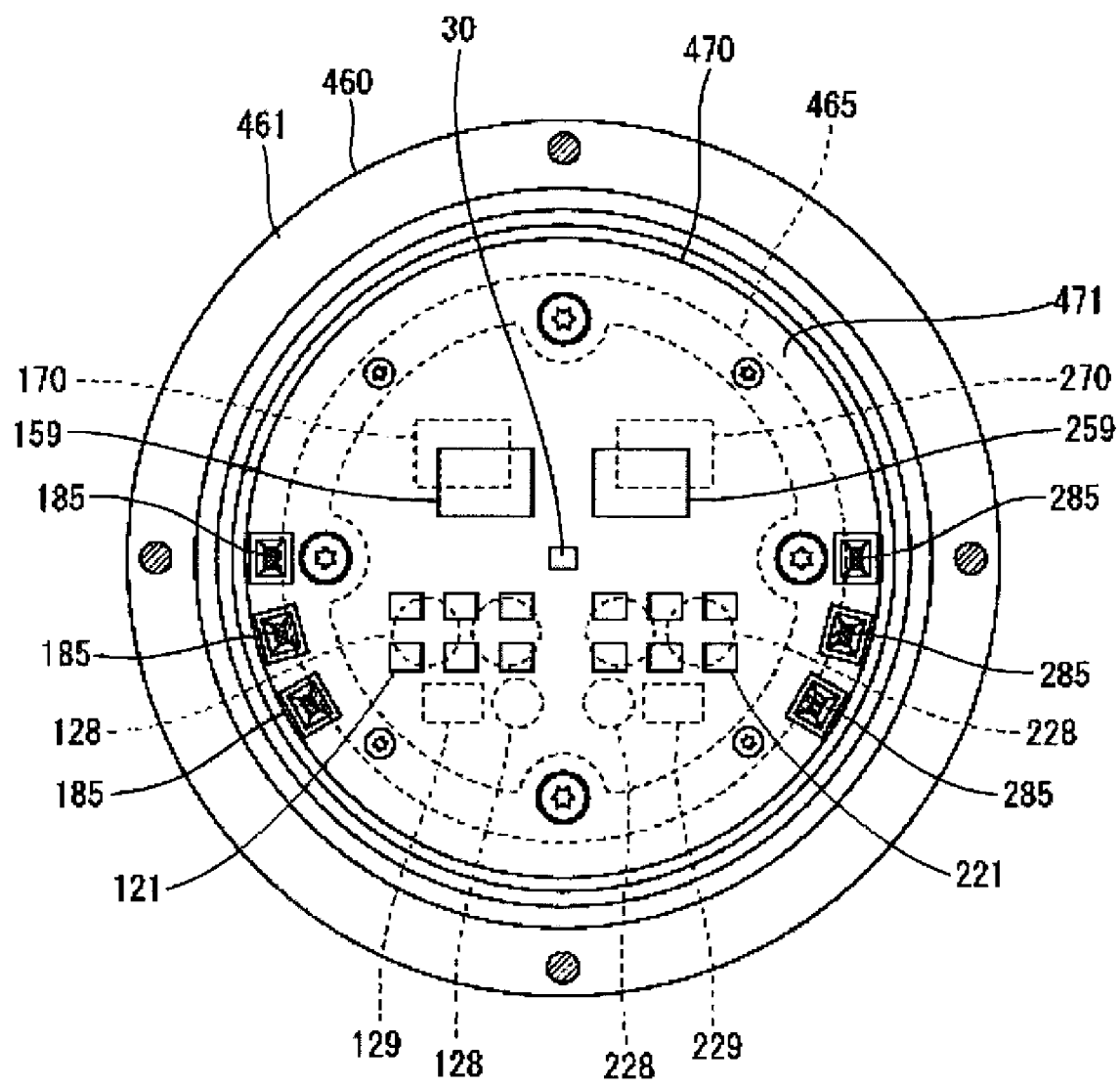
FIG. 3 is a cross-sectional view taken along a III-III line in FIG. 2.

Of the two principal surfaces of the circuit board 470, one surface on a motor 80 facing side is referred to as a motor-side surface 471 and the other surface opposite from the motor 80 is referred to as a cover-side surface 472. As shown in FIG. 3, on the motor-side surface 471, a switching element 121 constituting the first inverter 120, a switching element 221 constituting the second inverter 220, a rotation angle sensor 30, custom ICs 159, 259, and the like as a detection circuit are implemented. The rotation angle sensor 30 is mounted at a position facing the magnet 875 so as to be able to detect a change in a magnetic field as the magnet 875 rotates.

On the cover-side surface 472, capacitors 128, 228, inductors 129, 229, and microcomputers constituting the control units 170, 270 are mounted. In FIG. 3, the microcomputers constituting the first control unit 170 and the second control unit 270 are numbered "170" and "270", respectively. The capacitors 128 and 228 smooth the power input from the power sources 191 and 291. The capacitors 128 and 228 assist supply of electric power to the motor 80 by storing electric charge therein. The capacitors 128 and 228 and the inductors 129 and 229 constitute a filter circuit to reduce noise transmitted from other devices sharing the power sources 191 and 291, and to also reduce noise transmitted to the other devices sharing the power sources 191 and 291. It is noted that, power source relays, motor relays, current sensors, etc. (not shown in the drawings) are also mounted on the motor-side surface 471 or on the cover-side surface 472.

Figure 4:
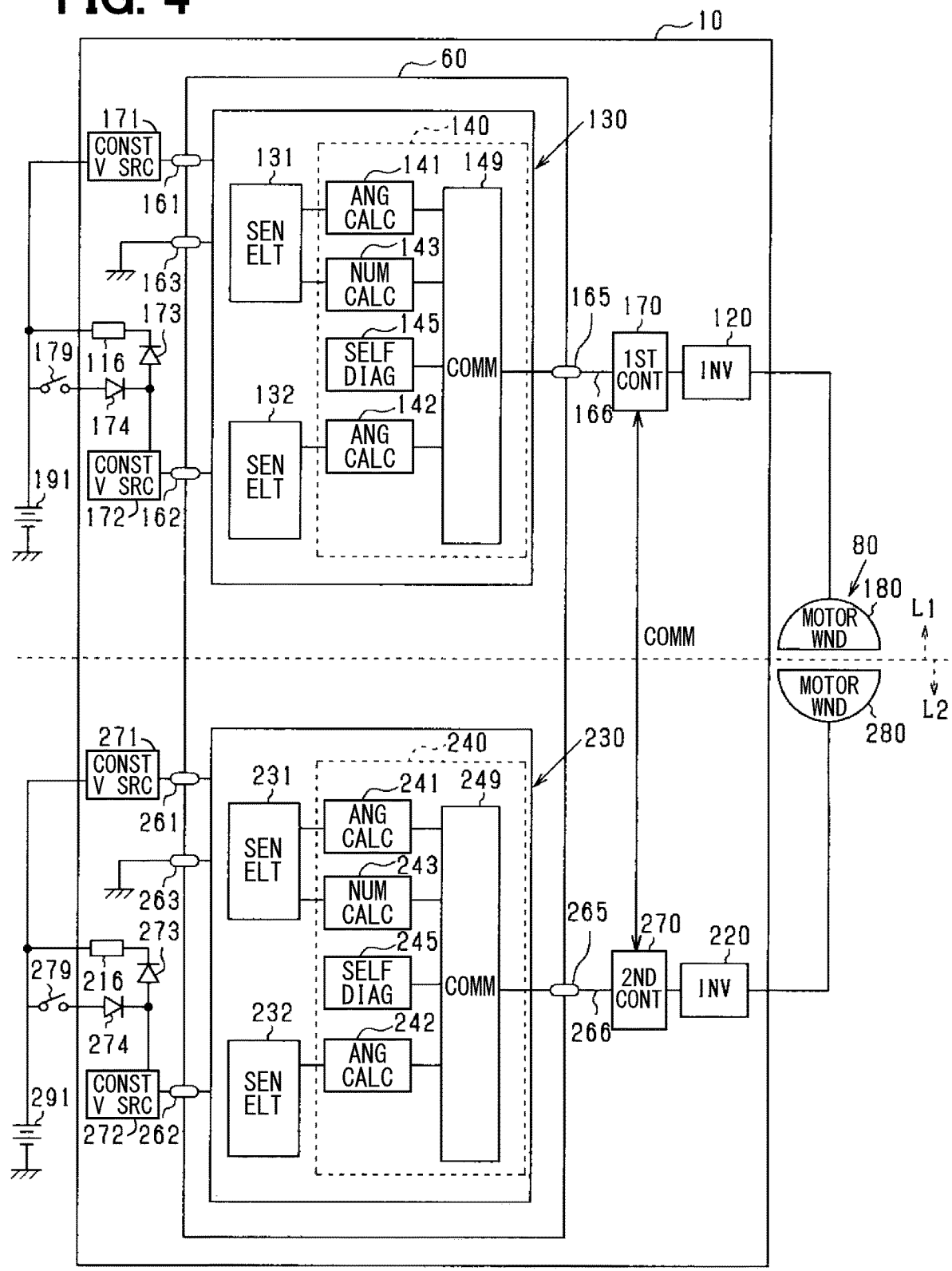
FIG. 4 is a block diagram of a control unit according to the first embodiment of the present disclosure.

As shown in FIG. 4, the ECU 10 is electrically connected to the motor 80, to the first power source 191, and to the second power source 291. The ECU 10 includes a sensor package 60, the first inverter 120 and the second inverter 220, the first control unit 170, the second control unit 270, and the like.

The first detection circuit 130 and the second detection circuit 230 are provided in one sensor package 60. The sensor package 60 is mounted on a substrate (not shown) at a position where it can detect the magnetic field of the magnet 875 that rotates integrally with the shaft 870 of the motor 80. By forming the detection circuits 130 and 230 in one package, the mounting area size can be reduced. In addition, a package may be provided for each of the detection circuits 130 and 230. The sensor package 60 is provided with power terminals 161, 162, 261, 262, ground terminals 163, 263, and communication terminals 165, 265.

The power terminal 161 is connected to the first power source 191 via a constant voltage source 171. The power terminal 162 is connected to the first power source 191 via a constant voltage source 172. The constant voltage source 172 is connected to the first power source 191 via a power source circuit 116 and a diode 173. The constant voltage source 172 is connected to the first power source 191 via a switch 179 and a diode 174. The diode 174 allows electric current to flow from the first power source 191 to the constant voltage source 172, and is arranged in a direction to prohibit a flow of a reverse current.

The power terminal 261 is connected to the second power source 291 via a constant voltage source 271. The power terminal 262 is connected to the second power source 291 via a constant voltage source 272. The constant voltage source 272 is connected to the second power source 291 via a power source circuit 216 and a diode 273. The constant voltage source 272 is also connected to the second power source 291 via a switch 279 and a diode 274. The diode 274 allows electric current to flow from the second power source 291 to the constant voltage source 272, and is arranged in a direction to prohibit a flow of a reverse current.

The switches 179, 279 are turned ON and OFF in synchronization with a start switch of the vehicle. One of the switches 179, 279 may be the start switch itself. The start switch of the present embodiment is an ignition switch. Hereinafter, the ignition switch may be referred to as "IG," and the ON/OFF of the switches 179 and 279 may be described as ON/OFF of the IG. In addition, a state in which the IG is turned OFF is referred to as "system stop."

The constant voltage sources 171, 172, 271, and 272 are regulators or the like that consume a small amount of electric power (e.g., several mA) so as to be capable of driving the detection circuits 130 and 230. Power supply to the detection circuits 130 and 230 is continued via the constant voltage sources 171 and 271 even while the IG is OFF. The ground terminals 163 and 263 are connected to the ground.

The first detection circuit 130 and the first control unit 170 are connected to be able to send and receive signals via the communication terminal 165 and a communication line 166. The second detection circuit 230 and the second control unit 270 are connected to be able to transmit and receive signals via the communication terminal 265 and a communication line 266. The first detection circuit 130 includes sensor elements 131 and 132 and a circuit unit 140. The second detection circuit 230 includes sensor elements 231 and 232 and a circuit unit 240.

The sensor elements 131, 132, 231, and 232 are magnetic detection elements that detect a change in magnetic field accompanying the rotation of the magnet 875 that rotates integrally with the shaft 870 of the motor 80. The sensor elements 131, 132, 231, and 232 may be, for example, MR elements such as GMR, AMR, or TMR, or Hall elements, which may be of the same type, or may be of different types. For example, the sensor elements 131 and 231 may be provided as GMR elements, and the sensor elements 132 and 232 may be provided as Hall elements, so that two sensor elements of the same detection circuit use different types of detection elements. The robustness of redundancy can be enhanced by using two different type sensors in one detection circuit. Note that throughout the specification, the term redundancy is defined as the ability of the steering system to allow the vehicle to maintain a straight path or to make turns as a driver or a vehicle path controlling system intended. As the detection values of the sensor elements 131, 132, 231, and 232, values obtained by AD conversion are used as required.

The circuit unit 140 includes angle calculators 141 and 142 as a first calculator, a number calculator 143 as a second calculator, a self-diagnosis unit 145, and a communication unit 149. The circuit unit 240 includes angle calculators 241 and 242 as a first calculator, a number calculator 243 as a second calculator, a self-diagnosis unit 245, and a communication unit 249. The angle calculator 141 calculates a rotation angle θm11 of the motor 80 based on a detection value of the sensor element 131. The angle calculator 142 calculates a rotation angle θm12 of the motor 80 based on a detection value of the sensor element 132. The angle calculator 241 calculates a rotation angle θm21 of the motor 80 based on a detection value of the sensor element 231. The angle calculator 242 calculates a rotation angle θm22 of the motor 80 based on a detection value of the sensor element 232.

The values calculated by the angle calculators 141, 142, 241, 242 are not limited to the rotation angle θm, but may be any value that enables the first control unit 170 to calculate the rotation angle θm. Hereinafter, the calculation of the angle calculator, including the above-described case, may simply be referred to as a "rotation angle calculation." The same applies to the calculation of the number of rotations TC. In the present embodiment, the rotation angle θm is a mechanical angle, which may also be an electric angle.

The number calculator 143 calculates a number of rotations TC11 of the motor 80 based on the detection value of the sensor element 131. The number calculator 243 calculates a number of rotations TC21 of the motor 80 based on the detection value of the sensor element 231.

The number of rotations TC can be calculated based on a count value, for example, by dividing one rotation (i.e., 360 degrees) of the motor 80 into three or more regions, and counting up or down according to the rotation direction each time the region changes. The rotation direction of the motor 80 is determinable by setting a division number div of one rotation of the motor 80 to 3 or more. In addition, by setting the division number div of one rotation to five or more regions, it is possible to determine the rotation direction of the motor 80 even when a region count is skipped. Further, the number of rotations TC may be calculated from the rotation angle θm. Here, "the number of rotations" in the present specification is not a so-called number of rotations (i.e., rotation speed) represented by a unit rpm or the like, but a value representing "how many rotations of the rotor have been made. The rotation angle θm and the number of rotations TC correspond to a rotation detection value of the motor 80.

The self-diagnosis unit 145 monitors a power source abnormality such as a short circuit of a power source or a ground fault regarding the sensor elements 131 and 132, the angle calculators 141 and 142, and/or the number calculator 143. Further, by monitoring an operation abnormality of an IC internal circuit of the first detection circuit 130, the abnormality of the rotation angle θm11 is monitored. For example, as a method of detecting an abnormality in the rotation angle θm11 due to an abnormality of the calculation circuit and/or the detection circuit that detects the outputs of the sensor elements 131 and 132 in the first detection circuit 130, the rotation angles θm11 and θm12 are compared with each other, which enables a detection of intermediate abnormalities such as an offset abnormality and the like.

The self-diagnosis unit 245 monitors a power source abnormality such as a short circuit or a ground fault of the sensor elements 231 and 232, the angle calculators 241 and 242, and the number calculator 243. Further, by monitoring the operation abnormality of the IC internal circuit of the second detection circuit 230, the abnormality of the rotation angle θm21 is monitored. For example, as a method of detecting an abnormality in the rotation angle θm21 due to an abnormality in the detection unit of the output of the sensor elements 231 and 232 in the second detection circuit 230 or an arithmetic circuit, the rotation angles θm21 and θm22 are compared to each other There is the possibility of detecting intermediate abnormalities.

The self-diagnosis method in the self-diagnosis units 145 and 245 is not limited to the above-described method, and any method may be used other than the above. The self-diagnosis result in the self-diagnosis unit 145, 245 is reflected in a status signal.

Further, instead of the abnormality monitoring by comparing the rotation angles θm11 and θm12 in the self-diagnosis unit 145, the first control unit 170 may perform abnormality monitoring by comparing the rotation angles θm11 and θm12. Similarly, instead of the abnormality monitoring based on the comparison of the rotation angles θm21 and θm22 in the self-diagnosis unit 245, the second control unit 270 may perform the abnormality monitoring based on the comparison of the rotation angles θm21 and θm22.

The communication unit 149 generates an output signal including a rotation angle signal related to the rotation angle θm and a rotation number signal related to the rotation number TC. The rotation number TC is an alternative expression of the number of rotations TC. The generated output signal is output to the first control unit 170 by digital communication such as SPI (Serial Peripheral Interface) communication or the like.

The communication unit 249 generates an output signal including a rotation angle signal related to the rotation angle θm and a rotation number signal related to the rotation number TC. The generated output signal is output to the second control unit 270 via the communication terminal 265 and the communication line 266 by digital communication such as SPI communication or the like.

In the present embodiment, electric power is constantly supplied from the first power source 191 to the sensor element 131, to the number calculator 143, and to the self-diagnosis unit 145 via the power terminal 161. In addition, when the power source circuit 116 or the switch 179 is turned ON, the sensor element 132, the angle calculators 141 and 142, and the communication unit 149 are supplied with electric power from the first power source 191, and, when the power source circuit 116 and the switch 179 are turned OFF, the sensor element 132, the angle calculators 141 and 142, and the communication unit 149 do not receive a supply of electric power, thereby stop their operation.

Further, electric power is constantly supplied from the second power source 291 to the sensor element 231, to the number calculator 243, and to the self-diagnosis unit 245 via the power terminal 261. Further, when the power source circuit 216 or the switch 279 is turned ON, the sensor element 232, the angle calculators 241 and 242, and the communication unit 249 are supplied with electric power from the second power source 291, and, when the power source circuit 216 and the switch 279 are turned OFF, the sensor element 232, the angle calculators 241 and 242, and the communication unit 249 do not receive a supply of electric power, thereby stop their operation.

The ECU 10 includes a storage unit 11, an abnormality determiner 12, a steer angle calculator 13, and a motor control unit 14. The ECU 10 is provided with a central processing unit or CPU and memories (ROM, RAM) not shown in the drawing, and when the CPU executes a program stored in the memory, functions of the above-described units are realized, thereby controlling the motor 80.

The storage unit 11 stores steer angle information on a steering angle of the steering shaft 92, which is a steering mechanism driven by the motor 80. The storage unit 11 is configured to be capable of storing at least the steer angle information when the motor 80 is stopped. The steer angle information includes various parameters, such as a detection value of an angle sensor (i.e., steer angle detection value) detecting a steering angle of the steering shaft 92, or other value(s) enabling the calculation of the steering angle (i.e., the rotation angle and/or the rotation number of the motor 80). That is, the steer angle information may include the steer angle detection value and the rotation detection value obtained from the detection circuits 130 and 230. In addition, the detection value of the torque sensor 94 which is usable for detecting a steering angle may be used as a steer angle detection value.

The storage unit 11 may perform processing for the purpose of storing the steer angle information correctly when storing the steer angle information. For example, the steer angle information may be stored under a condition that no abnormality is detected in the first power source 191 and the second power source 291. In addition, the storage unit 11 may store a certain value as the steer angle information, by obtaining a same detection value for a couple of times, for comparison therebetween, or for a calculation of an average, or for selecting a representative value. By storing the steer angle information accurately, an abnormality detection by the ECU 10 at a time of reading the steer angle information is readily performable.

The abnormality determiner 12 compares parameters including at least (i) a plurality of rotation detection values calculated by the detection circuits 130 and 230 based on detection values of the sensor elements 131, 132, 231 and 232 when the motor 80 is started, and (ii) the steer angle information (e.g., the rotation detection values of the detection circuits 130 and 230 in the past and/or the detection values of the steer angle sensor) stored in the storage unit 11 when the motor 80 is stopped for abnormality detection. More specifically, at least two parameters obtained by a supply of electric power via respectively different power supply paths are compared with each other, for an abnormality determination of the detection circuits 130 and 230 respectively included in different systems as well as an abnormality determination of the detection values thereof (i.e., the detection circuits 130, 230).

Since the rotation state of the motor 80 does not change until the motor 80 starts again after the motor 80 is stopped, the rotation detection value obtained at the start time of the motor 80, ideally, matches with the steer angle information stored at the previous stop time of the motor 80.

Therefore, at least two parameters from among the parameters including (i) the rotation detection value at the start time of the motor 80 and (ii) the steer angle information stored at the previous stop time immediately before the current start time are compared with each other, and by determining whether the rotation detection value and the steer angle information are matching with each other or diverted from each other, the abnormality determination of the detection circuits 130, 230 and their rotation detection values is performable.

When comparing the above-described parameters, the abnormality determiner 12 selects at least two parameters obtained by power supply from different power supply paths, for such comparison. For example, in two systems including the first system L1 and the second system L2, a parameter obtained by a supply of electric power only from the first power source 191, a parameter obtained by a supply of electric power only from the second power source 291, and a parameter obtained by a supply of electric power from both of the first power source 191 and the second power source 291 each correspond to or are treatable as a parameter obtained by power supply from different power supply paths.

If a parameter is a rotation detection value, the power supply path when obtaining this parameter corresponds to a power supply path that supplies power to the detection circuits 130 and 230. If a parameter is the steer angle information, the power supply path when obtaining this parameter is a power supply path that supplies electric power to a control unit (e.g., the first control unit 170 and the second control unit 270) that reads the steer angle information stored as a stored value.

When the steering system 90 includes a steer angle sensor, the storage unit 11 may store, as the steer angle information, a steer angle detection value detected by the steer angle sensor.

Further, the abnormality determiner 12 may be configured to compare at least two parameters at the start time of the motor 80, for an abnormality determination of each of the parameters. More specifically, from among the parameters including the rotation detection value, the steer angle information, the steer angle detection value obtained from the steer angle sensor, at least two parameters having respectively different power supply paths may be compared with each other for an abnormality determination of each of the parameters.

Note that, when comparing parameters, the rotation detection value and the steer angle detection value may be converted into common parameters for comparison by using the following equation (1) or the like described later.

The steer angle calculator 13 calculates a steering angle based on a parameter (i.e., a rotation detection value or steer angle information) not determined as abnormal by the abnormality determiner 12 from among a plurality of rotation detection values and the steer angle information.

Therefore, the steering angle can be calculated with high accuracy based on the rotation detection value of the detection circuit not determined as abnormal. The steer angle can be calculated from the rotation angle θm and the number of rotations TC using the following equation (1).

$$A = INT(TC/k) \times 360 + \theta m \tag{1}$$

In the above equation (1), a term "INT(TC/k)" represents an integer part of a quotient (TC/k) obtained by dividing the number of rotations TC by k which is the number of rotations TC per one rotation of the motor 80. For example, k is 4 if a count interval for determining an angle range of the number of rotations TC is 90°.

The motor control unit 14 calculates an instruction value of torque for the motor 80, i.e., a steering torque instruction value, based on a steering side absolute angle Y1 indicating a rotation amount (i.e., an absolute angle) of the steering shaft 92 accompanying the driver's steering operation, a steering torque Th and a vehicle speed Vc. The steering angle calculated by the steer angle calculator 13 is used as the steering side absolute angle Y1. Further, based on the steering torque instruction value, a control signal for controlling the motor 80, more specifically, an operation signal for operating the inverter, is calculated. The absolute angle Y1 is a value that indicates a rotation angle of the steering shaft 92 when turning the wheel 98 to either of a left or right steering limit angle from a neutral position of the steering shaft 92, which is an angle of the steering shaft 92 for a straight travel of the vehicle.

In the present embodiment, each of the first control unit 170 and the second control unit 270 includes a storage unit 11, an abnormality determiner 12, a steer angle calculator 13, and a motor control unit 14. Note that the storage unit 11, the abnormality determiner 12, the steer angle calculator 13, and the motor control unit 14 may be provided in only one of the first control unit 170 and the second control unit 270. Alternatively, separately from the first control unit 170 and the second control unit 270, the storage unit 11, the abnormality determiner 12, the steer angle calculator 13, and the motor control unit 14 may also be provided in the ECU 10.

Figure 5:
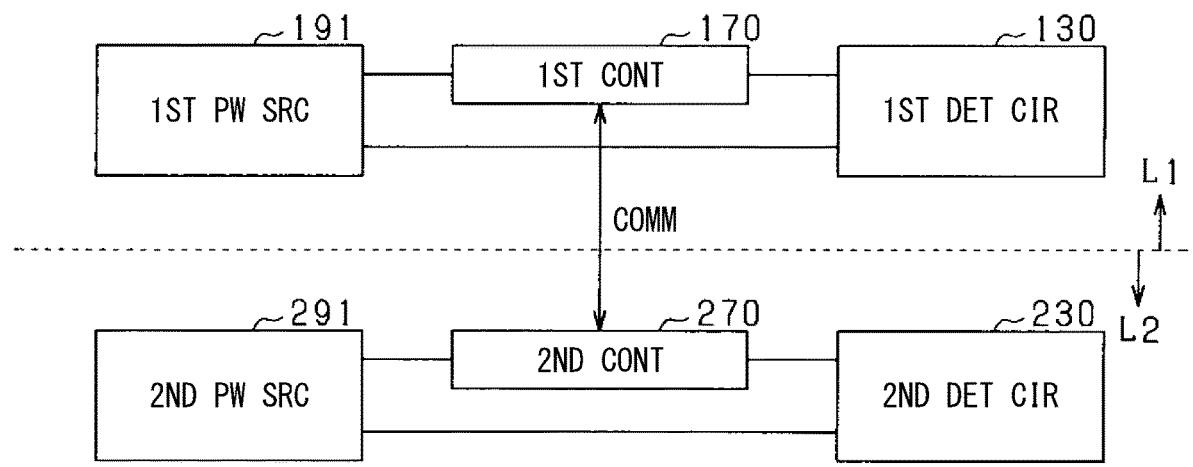
FIG. 5 is a diagram schematically showing a power supply path and a communication path in the control unit according to the first embodiment of the present disclosure.

FIG. 5 schematically shows the power supply paths and the communication paths of the first system L1 and the second system L2 shown in FIG. 4. The first power source 191, the first control unit 170, and the first detection circuit 130 constituting the first system L1 are electrically connected to each other. The second power source 291, the second control unit 270, and the second detection circuit 230 constituting the second system L2 are electrically connected to each other. The power supply path connecting the first power source 191 and the first detection circuit 130 corresponds to a first power supply path for supplying electric power from a power source to the first detection circuit 130, which belongs to the first system L1. The power path connecting the second power source 291 and the second detection circuit 230 corresponds to a second power supply path for supplying electric power from a power source to the second detection circuit 230, which belongs to the second system L2. The first control unit 170 and the second control unit 270 can perform bidirectional communication.

The first control unit 170 can obtain the number of rotations (TC1) as the rotation detection value from the first detection circuit 130, and can store this as a stored value 1. The second control unit 270 can obtain the number of rotations (TC2) as the rotation detection value from the second detection circuit 230, and can store this as a storage value 2. The first control unit 170 can obtain TC2 and the stored value 2 from the second control unit 270 by bidirectional communication. Similarly, the second control unit 270 can obtain TC1 and the stored value 1 from the first control unit 170 by bidirectional communication.

As shown in FIGS. 4 and 5, a power source and a control unit are provided separately in each of the plurality of systems. That is, the first power source 191, the first control unit 170, and the first detection circuit 130 are provided in the first system L1, and the second power source 291, the second control unit 270, and the second detection circuit 230 are provided in the second system L2. Since the first power source 191 and the second power source 291 are independent from each other, it is possible to reduce a possibility of having abnormality in the power source at the same time in both of the first detection circuit 130 and the second detection circuit 230. Further, since the first control unit 170 and the second control unit 270 are independent from each other, a possibility of having abnormality in both of the two control units 170, 270 at the same time can be reduced. As a result, a highly redundant and robust steering system 90 can be provided.

Note that a regulator may further be provided at a position between (i) the first power source 191 and (ii) the first control unit 170 or the first detection circuit 130, and at a position between (iii) the second power source 291 and (iv) the second control unit 270 or the second detection circuit 230. In addition, instead of using the first power source 191 and the second power source 291, one power source may be used. For example, one power source may be connected to the first power supply path and the second power supply path, and a switching element may be provided on each of the two power supply paths. Then, by switching the switching element, one power source can be connected to only one of the first power supply path and the second power supply path, thereby the supply of electric power is switchably providable from one power source to the first detection circuit 130 and to the detection circuit 230. It can be understood that the power supply path to the first detection circuit 130 belongs to the first system L1 and the power supply path to the second detection circuit 230 belongs to the second system L2 for supplying electric power from one power source.

Figure 6:
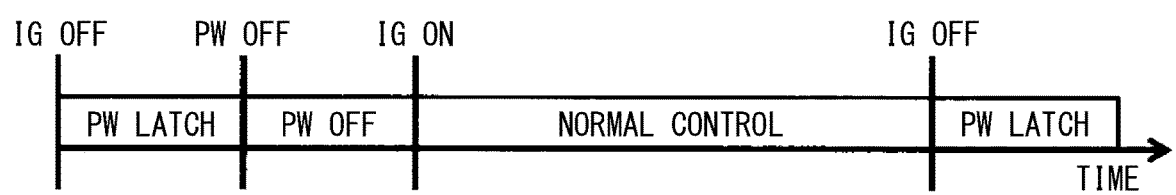
FIG. 6 is a state transition diagram of the steering system according to the first embodiment of the present disclosure.

FIG. 6 shows a state transition diagram of the steering system 90 regarding an operation state thereof, where the horizontal axis is a time axis. Chronologically from a left side of FIG. 6, first, when an ignition is changed from an ON state to an OFF state, a state transitions from a normal control period (not illustrated) to a power latch period. Thereafter, a period until power OFF is a power latch period, in which an output from the ECU 10 to the drive device 40 is OFF while the ECU 10 is in an ON state.

At a start timing of the power latch period, at which the ignition is turned OFF (i.e., IG OFF in FIG. 6), the vehicle is stopped (i.e., a vehicle speed is 0), the drive device 40 is in an OFF state, and the ECU 10 does not transmit a control signal to the drive device 40. When the ignition is turned OFF, which is the start of the power latch period, a storage of the steer angle information is performed. More specifically, the ROM of the ECU 10 stores the number of rotations (i.e., TC value) obtained from the detection circuits 130 and 230, the detection value of the steer angle sensor (i.e., a steering angle sensor, a turning angle sensor), and the like.

When the power OFF is performed, the ECU 10 changes from an ON state to an OFF state. Thereafter, a period until IG ON is a power OFF period, and both the drive device 40 and the ECU 10 are in an OFF state.

Thereafter, the state shifts to an ignition IG ON state, and the ECU 10 and the drive device 40 change to an ON state. After that, it is a normal control period until the ignition is turned OFF. During the normal control period, the number of rotations, the steering angle, the turning angle, etc. stored in the ROM of the ECU 10 is read to the RAM. The stored values of the steering angle and the turning angle stored in the power latch period can be used as offset correction values when the ECU 10 calculates the steer angle in the normal control period. The stored value of the number of rotations stored in the power latch period can be used to determine whether the offset correction values of the steering angle and the turning angle read to the RAM are read correctly. Further, when it is determined that the reading of the steering angle and the turning angle to the RAM is abnormal as a result of the above determination, abnormal values of the steering angle and the turning angle are stored in the ROM. Normal reading of the offset correction values of the steering angle and the turning angle to the RAM is determinable (i) by the comparison with the abnormal values of the steering angle and the turning angle and (ii) by the comparison with the steering angle and the turning angle stored in the power latch period.

Thereafter, after the ignition is turned OFF, the power latch period starts.

As described above, at the start timing of the power latch period, the number of rotations, the steering angle, the turning angle, and the like are stored in the ROM. Note that the number of rotations is continuously obtained from the detection circuits 130 and 230 at a predetermined cycle in both of the power latch period and the normal control period.

The power latch period may be configured to directly transition to the normal control period without having the power OFF period. If the ignition is turned from an OFF state to an ON state during the power latch period, the power OFF period is omitted. In such a case, in the normal control period, the offset correction values used in the normal control period in the previous cycle may be used as it is without updating the offset correction values of the steering angle and the turning angle.

Figure 7:
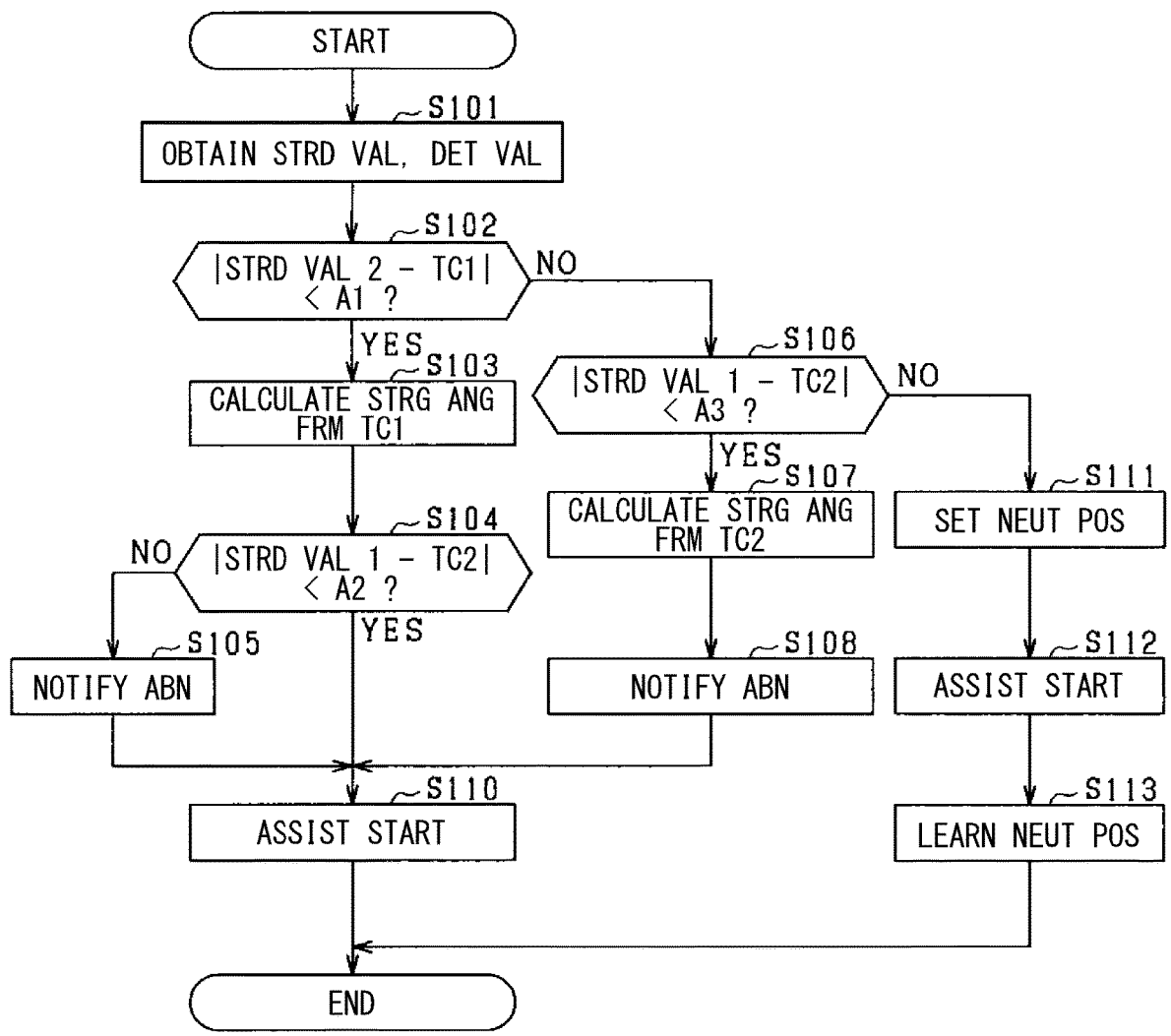
FIG. 7 is a flowchart of steer angle calculation processing according to the first embodiment of the present disclosure.

FIG. 7 shows a flowchart of a steer angle calculation process performed by the first control unit 170 when the motor 80 is started, in case that the power supply paths in the first system L1 and the second system L2 are in a state shown in FIG. 5. In FIG. 7, first, in step S101, the stored value 1 and the stored value 2 are obtained, and the number of rotations TC1 of the motor 80 is obtained from the first detection circuit 130 as a detection value, and the number of rotations TC2 of the motor 80 is obtained from the second detection circuit 230 as a detection value. The number of rotations TC1 obtained from the first detection circuit 130 when the motor 80 is stopped immediately before is stored in the first control unit 170 as the stored value 1. The number of rotations TC2 obtained from the second detection circuit 230 when the motor 80 is stopped immediately before is stored in the second control unit 270 as the stored value 2. Referring to FIG. 6, when the ignition is ON at the start time of the normal control, the number of rotations TC1 and TC2 are obtained, and the stored value 1 and the stored value 2 stored at the ignition OFF time immediately before (i.e., at the start time of the power latch period) are read. Thereafter, the process proceeds to step S102.

In step S102, it is determined whether the difference between the stored value 2 and the number of rotations TC1 is smaller than a predetermined value A1. The stored value 2 is a parameter read from the second control unit 270 by a power supply from the second power source 291, and the number of rotations TC1 is a parameter obtained from the first detection circuit 130 by a power supply from the first power source 191. Therefore, the stored value 2 and the number of rotations TC1 correspond to parameters obtained by a power supply from different power supply paths. More specifically, if a relationship | the stored value 2−TC1|<A1 is satisfied, which means an absolute value of a result of a subtraction equation (e.g., the stored value 2−TC1) is smaller than a value A1, it is determined that the number of rotations TC1 is normal, and the process proceeds to step S103. If | the stored value 2−TC1|≥A1, it is determined that the number of rotations TC1 is abnormal, and the process proceeds to step S106.

In step S103, after the steering angle of the steering mechanism is calculated based on the number of rotations TC1 determined as normal, the process proceeds to step S104. In step S104, it is determined whether a difference between the stored value 1 and the number of rotations TC2 (i.e., an absolute value of the subtraction value) is smaller than a predetermined value A2. The stored value 1 is a parameter read from the first control unit 170 by a power supply from the first power source 191, and the number of rotations TC2 is a parameter obtained from the second detection circuit 230 by a power supply from the second power source 291. Therefore, the stored value 1 and the number of rotations TC2 correspond to parameters obtained by a power supply from different power supply paths. More specifically, if | the stored value 1−TC2 |<A2 is satisfied, which means that an absolute value of a result of a subtraction equation (e.g., the stored value 1−TC2) is smaller than a value A2, it is determined that the number of rotations TC2 is normal, and the process proceeds to step S110. If | the stored value 1−TC2|≥A2, it is determined that the number of rotations TC2 is abnormal, the process proceeds to step S105, and, after notification of abnormality is performed by using a meter or the like, the process proceeds to step S110. In this case, an abnormality in the second system L2 is notified.

In step S106, it is determined whether a difference between the stored value 1 and the number of rotations TC2 (i.e., an absolute value of the subtraction value) is smaller than the predetermined value A3. More specifically, if | the stored value 1−TC2|<A3, which means that the absolute value of the result of the subtraction equation (i.e., the stored value 1−TC2) is smaller than a value A3, it is determined that the number of rotations TC2 is normal, and the process proceeds to step S107. In step S106, when | the stored value 1−TC2|≥A3, the number of rotations TC2 is determined as abnormal, and the process proceeds to step S111.

The predetermined values A1 to A3 correspond to a so-called first threshold value, which may be set, for example, to a value within a "normal" range based on the history of the rotation detection values obtained by the first detection circuit 130 and the second detection circuit 230 when the motor 80 is started in the past. Further, the predetermined value A3 may be set to the same value as the predetermined value A2.

In step S107, the steering angle is calculated based on the number of rotations TC2 determined as normal, and then the process proceeds to step S108. In step S108, notification of abnormality in the first system L1 is performed by a meter or the like. Then, the process proceeds to step S110.

In step S110, a drive control of the motor 80 is performed based on the steering angle calculated in step S103 or step S107, and a steering assist control is performed. Thereafter, the process comes to an end.

On the other hand, in step S111, a neutral position setting of the steering shaft 92 is performed. More specifically, for example, a driver or a mechanic is notified of an operation of the steering wheel 91, i.e., for an adjustment of an initial position of the steering wheel 91 to the neutral position. Alternatively, the neutral position setting may be performed after notifying the driver, the mechanic, etc. about the setting operation which automatically sets the initial position of the steering wheel 91 to the neutral position. Alternatively, after sending an instruction for starting a neutral position setting from a service tool for vehicle maintenance or the like, the steering wheel 91 may be operated by the driver, the mechanic or the like to set the neutral position. Furthermore, it may be preferable that an instruction or an operation relating to the neutral position setting be provided with a failsafe function, allowing the neutral position setting only during a vehicle stop time, for example. Note that the initial position of the steering wheel 91 means an angle of the steering wheel 91 used for a straight travel of the vehicle.

After step S111, the process proceeds to step S112, where the drive control of the motor 80 is performed based on the neutral position set in the above-described manner, and the steering assist control is performed. Thereafter, the process proceeds to step S113, and the neutral position is learned, and, after the neutral position set in the above-described manner is stored in the ECU 10, the process comes to an end. Note that the steering assist control switched to a safer side, which is realized by turning OFF of a cooperative control and/or a part of a compensation control, may be performed until the learning of the neutral position is complete. Further, when performing the steering assist control switched to the safe side, the driver may be notified about such switching by a turning ON of a warning lamp on a meter or the like.

As described above, according to the first embodiment, the first detection circuit 130 is configured to receive a supply of electric power from the first power source 191, and the second detection circuit 230 is configured to receive a supply of electric power from the second power source 291.

The first control unit 170 of the ECU 10 compares (i) the number of rotations TC1 obtained by the power supply from the first power source 191 when the motor 80 is started and (ii) the stored value 2 stored when the motor 80 is stopped immediately before and read by the power supply from the second power source 291 (i.e., the stored value of the number of rotations TC2), for an abnormality determination of whether a value of the number of rotations TC1 is abnormal.

Further, first control unit 170 of the ECU 10 compares (i) the number of rotations TC2 obtained by the power supply from the second power source 291 when the motor 80 is started and (ii) the stored value 1 stored when the motor 80 is stopped immediately before and read by the power supply from the first power source 191 (i.e., the stored value of the number of rotations TC1), for an abnormality determination of whether a value of the number of rotations TC2 is abnormal.

Since the number of rotations of the motor 80 does not change among two timings, i.e., (i) when the motor 80 is stopped immediately before and (ii) when the motor 80 is started again, the stored value 2 and the stored value 1 are respectively usable for an abnormality determination of the detection values of the number of rotations TC1 and TC2. Further, the steering angle is calculable based on the value of the number of rotations that has not been determined as abnormal.

Further, at the time of abnormality determination, the stored value and the number of rotations obtained by a power supply from different power supply paths are selected and compared with each other, a false positive determination is preventable, i.e., a determination that determines the steering system as normal based on the stored value and the number of rotations both having abnormality due to abnormality of a single power supply path for both is avoidable.

Note that, since the power supply path to the first detection circuit 130 and the power supply path to the second detection circuit 230 are independent from each other, the number of rotations TC1 or TC2 may highly likely be usable for the calculation of the steering angle even when abnormality occurs in the power source or in the power supply path, improving redundancy in such calculation.

Further, when it is determined that the first detection circuit 130 and the second detection circuit 230 are both abnormal, the initial position can be set to the neutral position, and the redundancy is further improved.

That is, according to the first embodiment, the steering angle calculation can be performed with high accuracy, and the steering angle calculation processing can be made redundant, and the reliability of the steering system 90 can be improved.

Second Embodiment

Figure 8:
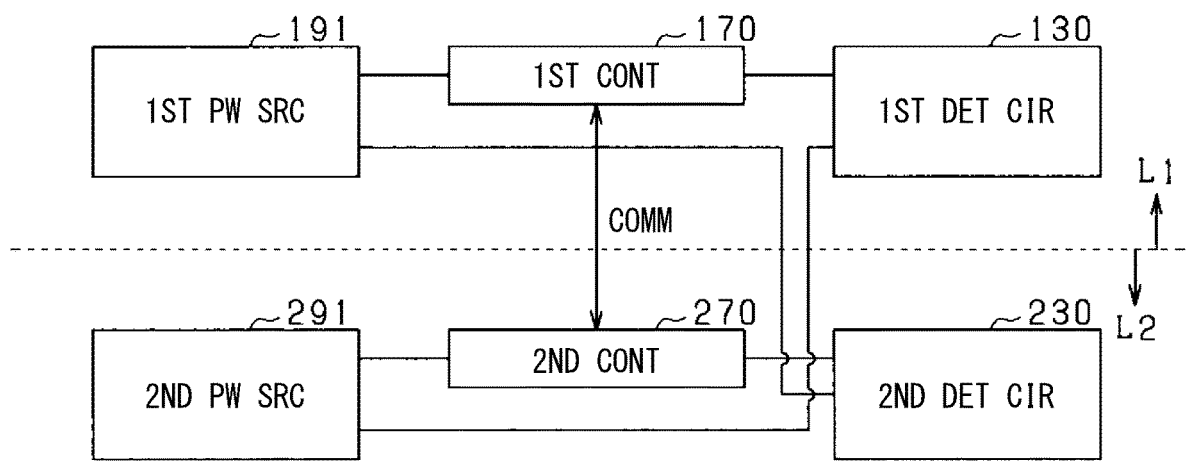
FIG. 8 is a diagram schematically showing the power supply path and the communication path in the control unit according to a second embodiment of the present disclosure.

In the steering system according to the second embodiment, the power supply paths of the systems L1 and L2 are different from those of the first embodiment as shown in FIG. 8. FIG. 8 shows a configuration different from FIG. 5, in which each of the first detection circuit 130 and the second detection circuit 230 receives a supply of electric power from both of the first power source 191 and the second power source 291. Note that the power supply path connecting the first power source 191 and the second detection circuit 230 and the power supply path connecting the second power source 291 and the second detection circuit 230 via the second control unit 270 both correspond to a second power supply path for supplying electric power to the second detection circuit 230, and belong to the second system L2. Further, the power supply path connecting the second power source 291 and the first detection circuit 130 and the power supply path connecting the first power source 191 and the first detection circuit 130 via the first control unit 170 both correspond to a first power supply path for supplying electric power to the first detection circuit 130, and belong to the first system L1. The other configuration is the same as that of the first embodiment, and hence the description is omitted.

Figure 9:
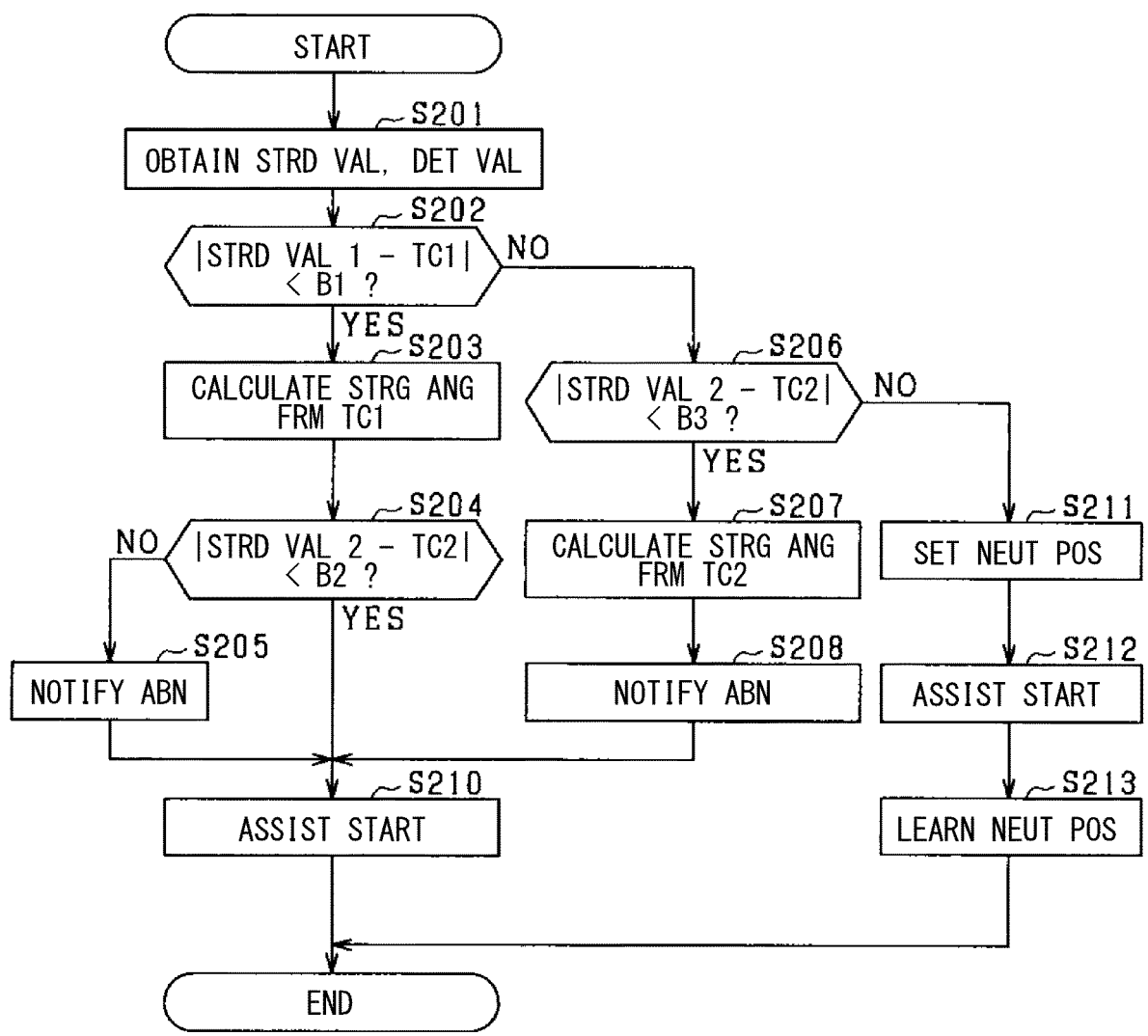
FIG. 9 is a flowchart of steer angle calculation processing according to the second embodiment of the present disclosure.

FIG. 9 shows a flowchart of the steer angle calculation process performed by the first control unit 170 when the motor 80 is started in the present embodiment.

First, in step S201, the stored value 1 and the stored value 2 are obtained, the number of rotations TC1 of the motor 80 is obtained from the first detection circuit 130, and the number of rotations TC2 of the motor 80 of the second detection circuit 230 is obtained. The number of rotations TC1 obtained from the first detection circuit 130 when the motor 80 is stopped immediately before is stored in the first control unit 170 as the stored value 1. The number of rotations TC2 obtained from the second detection circuit 230 when the motor 80 is stopped immediately before is stored in the second control unit 270 as the stored value 2. Thereafter, the process proceeds to step S202.

In step S202, it is determined whether the difference between the stored value 1 and the number of rotations TC1 is smaller than a predetermined value B1. The stored value 1 is a parameter read from the first control unit 170 by the power supply from the first power source 191, and the number of rotations TC1 is a parameter obtained by from the first detection circuit 130 by the power supply from the first power source 191 and the second power source 291. Therefore, the stored value 1 and the number of rotations TC1 correspond to parameters obtained by the power supply from different power supply paths. More specifically, if | stored value 1−TC1|<B1, the process proceeds to step S203. If | stored value 1−TC1|≥B1, the process proceeds to step S206.

In step S203, after the steering angle of the steering mechanism is calculated from the number of rotations TC1, the process proceeds to step S204. In step S204, it is determined whether the difference between the stored value 2 and the number of rotations TC2 (i.e., an absolute value of the subtraction value) is smaller than a predetermined value B2. More specifically, if | stored value 2−TC2|<B2, the process proceeds to step S210. In case where | stored value 2−TC2|≥B2, the process proceeds to step S205, and after notification of abnormality is performed by a meter or the like, the process proceeds to step S210. In such case, an abnormality in the second detection circuit 230 is notified.

In step S206, it is determined whether the difference between the stored value 2 and the number of rotations TC2 (i.e., an absolute value of the subtraction value) is smaller than a predetermined value B3. The stored value 2 is a parameter read from the second control unit 270 by the power supply from the second power source 291, and the number of rotations TC2 is a parameter obtained from the second detection circuit 230 by the power supply from the first power source 191 and the second power source 291. Therefore, the stored value 2 and the number of rotations TC2 correspond to parameters obtained by power supply from different power supply paths. More specifically, if | stored value 2−TC2|<B3, the process proceeds to step S207. In the case where | stored value 2−TC2|≥B3 in step S206, the process proceeds to step S211.

Note that the predetermined values B1 to B3 correspond to so-called second threshold values, and are set, for example, within a "normal" range based on the history of the rotation detection values obtained by the first detection circuit 130 and the second detection circuit 230 when the motor 80 is started in the past. The predetermined value B3 may be set to the same value as the predetermined value B2.

In step S207, after the steering angle is calculated based on the number of rotations TC2, the process proceeds to step S208. In step S208, notification of abnormality in the first detection circuit 130 is performed by a meter or the like. Thereafter, the process proceeds to step S210.

In step S210, the drive control of the motor 80 is performed based on the steering angle calculated in step S203 or step S207, and steering assist control is performed. Thereafter, the process comes to an end.

On the other hand, since the processes of steps S211 to S213 are the same as steps S111 to S113, the description thereof is omitted.

Third Embodiment

Figure 10:
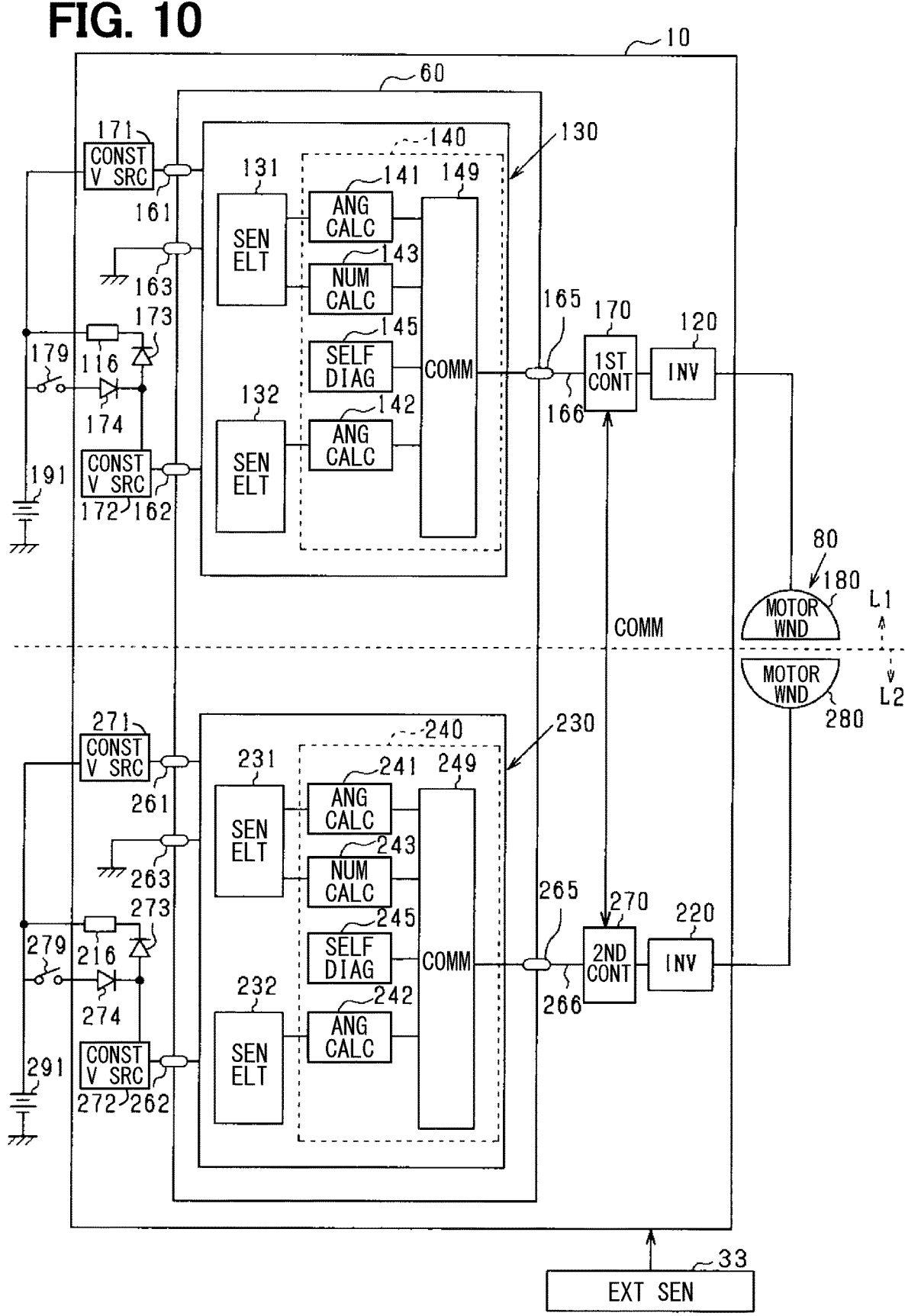
FIG. 10 is a block diagram of the control unit according to a third embodiment of the present disclosure.

The steering system 90 according to the third embodiment further includes an external sensor 33 as shown in FIG. 10, and the ECU 10 is configured to be capable of obtaining the detection value of the external sensor 33, which is different from the first embodiment. The external sensor 33 is a steer angle sensor, and, more specifically, is a steering angle sensor (e.g., a torque sensor 94 etc.) capable of detecting the steering angle of the steering mechanism when the motor 80 drives the steering mechanism. On the other hand, when the motor 80 drives the steered mechanism as in a modification described later, the external sensor 33 is a turning angle sensor (e.g., a rack stroke sensor) or the like capable of detecting the turning angle of the steered mechanism.

Figure 11:
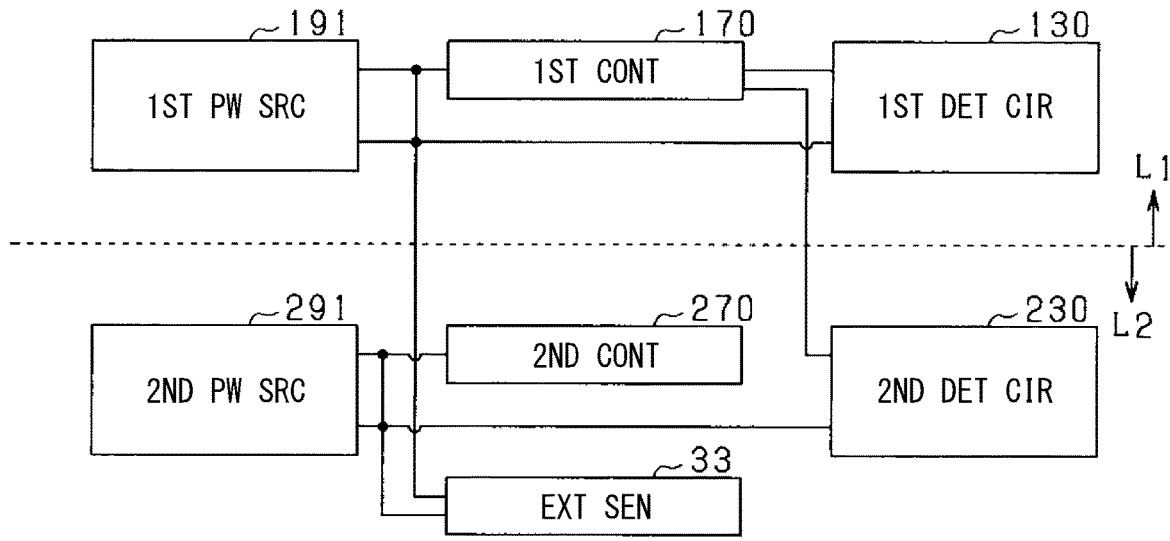
FIG. 11 is a diagram schematically showing the power supply path and the communication path in the control unit according to the third embodiment of the present disclosure.

As shown in FIG. 11, the first power source 191, the first control unit 170, and the first detection circuit 130 that constitute the first system L1 are electrically connected to each other. The first detection circuit 130 is supplied with electric power from the first power source 191, and the power supply path belongs to the first system L1. The second power source 291 constituting the second system L2 is electrically connected to the second control unit 270 and to the second detection circuit 230, respectively. The second detection circuit 230 is further electrically connected to the first control unit 170. The second detection circuit 230 is supplied with electric power from both of the first power source 191 and the second power source 291, and this power supply path belongs to the second system. The external sensor 33 is installed outside the ECU 10 independently of any of the first system L1 and the second system L2. The external sensor 33 is electrically connected to the first power source 191, the first control unit 170, the first detection circuit 130, the second power source 291, the second control unit 270, and the second detection circuit 230. The external sensor 33 is supplied with electric power from both of the first power source 191 and the second power source 291. The first control unit 170 can obtain the number of rotations TC1 and TC2 from the first detection circuit 130 and the second detection circuit 230. The first control unit 170 can obtain the detected value of the steering angle from the external sensor 33, and can store it as the stored value 1. The other configuration is the same as that of the first embodiment, and hence the description is omitted.

Figure 12:
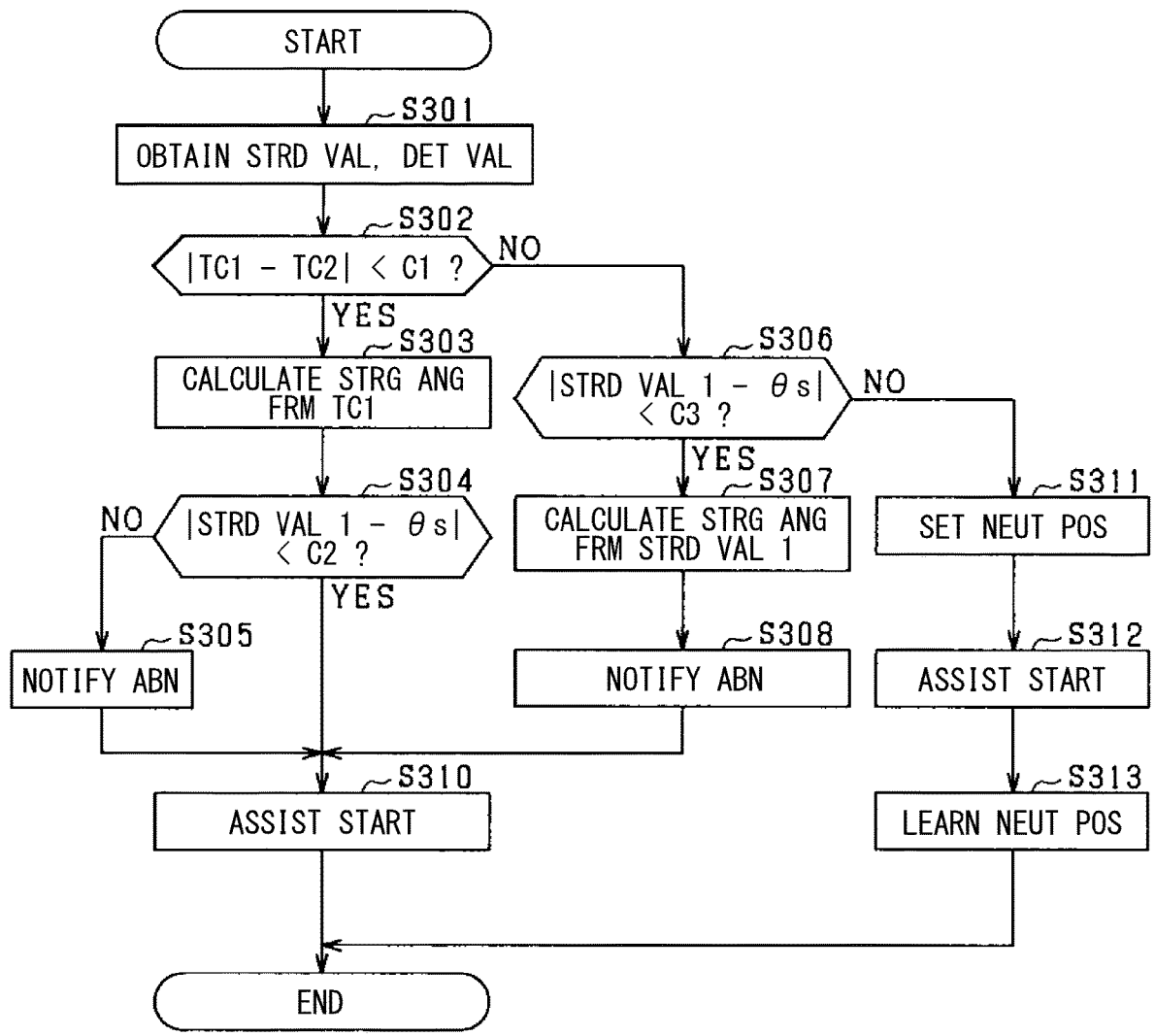
FIG. 12 is a flowchart of steer angle calculation processing according to the third embodiment of the present disclosure.

FIG. 12 shows a flowchart of the steer angle calculation process performed by the first control unit 170 when the motor 80 is started in the present embodiment.

First, in step S301, the stored value 1 is obtained, the number of rotations TC1 of the motor 80 is obtained from the first detection circuit 130, and the number of rotations TC2 of the motor 80 is obtained from the second detection circuit 230. The steering angle θs obtained from the external sensor 33 when the motor 80 is stopped immediately before is stored in the first control unit 170 as the storage value 1. Thereafter, the process proceeds to step S302.

In step S302, it is determined whether the difference between the number of rotations TC1 and the number of rotations TC2 is smaller than a predetermined value C1. The number of rotations TC1 is a parameter obtained from the first detection circuit 130 by the power supply from the first power source 191, and the number of rotations TC2 is a parameter obtained from the second detection circuit 230 by the power supply from the first power source 191 and the second power source 291. Therefore, the number of rotations TC1 and the number of rotations TC2 correspond to parameters obtained by power supply from different power supply paths. More specifically, if |TC1−TC2|<C1, it is determined that the number of rotations TC1 is normal, and the process proceeds to step S303. If |TC1−TC2|≥C1, the process proceeds to step S306.

Note that the predetermined value C1 corresponds to a so-called third threshold value. For example, the predetermined value C1 is set to a value within a "normal" range based on the history of the rotation detection values obtained by the first detection circuit 130 and the second detection circuit 230 when the motor 80 is started in the past.

In step S303, after the steering angle of the steering mechanism is calculated from the number of rotations TC1, the process proceeds to step S304. In step S304, it is determined whether the difference between the stored value 1 and the steering angle θs (i.e., an absolute value of the subtraction value) is smaller than a predetermined value C2. The stored value 1 is a parameter read from the first control unit 170 by the power supply from the first power source 191, and the steering angle θs is a parameter obtained from the external sensor 33 by the power supply from the first power source 191 and the second power source 291. Therefore, the stored value 1 and the steering angle θs correspond to parameters obtained by power supply from different power supply paths. More specifically, if | stored value 1−θs|<C2, it is determined that the detection value of the steering angle θs is normal, and the process proceeds to step S310. If | stored value 1−steering angle θs|≥C2, it is determined that the detection value of the steering angle θs is abnormal, and the process proceeds to step S305, and after notification of abnormality is performed by a meter or the like, the process proceeds to S310. In this case, an abnormality of the external sensor 33 is notified.

In step S306, it is determined whether the difference between the stored value 1 and the steering angle θs (i.e., an absolute value of the subtraction value) is smaller than a predetermined value C3. More specifically, if | stored value 1−θs|<C3, it is determined that the detection value of the steering angle θs is normal, and the process proceeds to step S307. In case where | stored value 1−θs|≥C3 in step S306, it is determined that the external sensor 33 is abnormal, and the process proceeds to step S311.

Note that the predetermined values C2 and C3 correspond to a so-called fourth threshold value, and for example, is set to a value within a "normal" range based on (i) a history of the rotation detection values obtained by the first detection circuit 130 and the second detection circuit 230 when the motor 80 is stopped in the past, or (i) a history of the steering angle obtained by the external sensor 33.

Further, the predetermined value C3 may be set to the same value as the predetermined value C2.

In step S307, after the steering angle is calculated based on the stored value 1, the process proceeds to step S308. In step S308, notification of abnormality in the first detection circuit 130 and the second detection circuit 230 is performed by a meter or the like. Thereafter, the process proceeds to step S310.

In step S310, a drive control of the motor 80 is performed based on the steering angle calculated in step S303 or step S307, and steering assist control is performed. Thereafter, the process comes to an end.

On the other hand, since the processes of steps S311 to S313 are the same as steps S111 to S113, the description thereof is omitted.

As described above, according to the third embodiment, the first detection circuit 130 is configured to be supplied with electric power from the first power source 191, and the second detection circuit 230 is configured to be supplied with electric power from the second power source 291. Further, a steer angle sensor is provided as the external sensor 33. The first control unit 170 of the ECU 10 determines, when the motor 80 is started, whether the number of rotations TC1, TC2 are abnormal by comparing (i) a value of the rotation number TC1 obtained by the power supply from the first power source 191 and (ii) the number of rotations TC2 obtained by the power supply from both of the first power source 191 and the second power source 291. Therefore, by selecting the number of rotations obtained by the power supply from different power supply paths at the time of abnormality determination and comparing them with each other, abnormality determination is performable without suffering from false abnormality determination. Further, by comparing (i) the steering angle θs obtained by the power supply from both of the first power source 191 and the second power source 291 when the motor 80 is started, and (ii) the stored value 1 stored at the stop time of the motor 80 immediately before and read by the power supply from the first power source 191 (i.e., stored value of θs), whether the steering angle θs is abnormal or is determined. Therefore, at the time of abnormality determination, by selecting and comparing (i) the stored value of the steering angle and (ii) the detection value respectively obtained by the power supply from different power supply paths, the erroneous determination in the abnormality determination is prevented.

Further, when it is determined that the number of rotations TC1 and the number of rotations TC2 are both normal based on the comparison therebetween, the detection value of the number of rotations is used for abnormality determination. On the other hand, when at least one of the first detection circuit 130 and the second detection circuit 230 is determined as abnormal, the abnormality determination is performed by comparing the stored value 1 with the steering angle θs. When it is determined that the steering angle is normal, the steering angle can be calculated based on the steering angle stored as the stored value 1. As a result, the steering angle calculation can be performed with high accuracy, and the steer angle calculation process can be made redundant, and the reliability of the steering system 90 can be improved.

(Modification)

Figure 13:
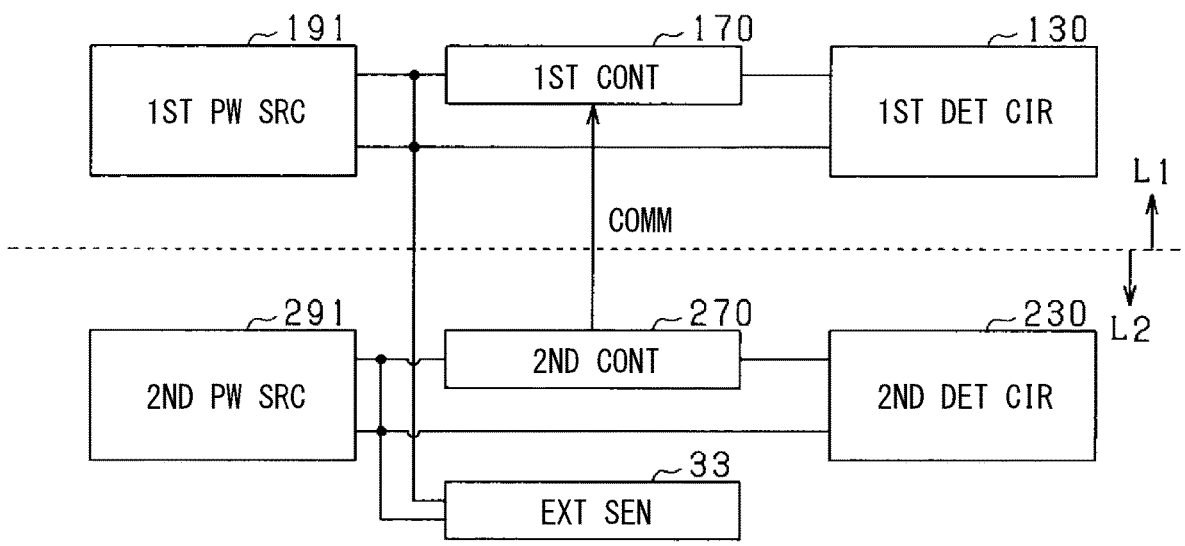
FIG. 13 is a diagram schematically showing the power supply path and the communication path in the control unit according to a modification of the third embodiment of the present disclosure.

As a modification of the third embodiment, a configuration provided with the power supply path and the communication path shown in FIG. 13 is illustrated. In this modification, as shown in FIG. 13, the second detection circuit 230 is electrically connected to the second control unit 270 instead of the first control unit 170. The second detection circuit 230 is supplied with electric power from the second power source 291, and this power supply path belongs to the second system L2. The external sensor 33 is electrically connected to the first power source 191, the first control unit 170, the first detection circuit 130, the second power source 291, the second control unit 270, and the second detection circuit 230. The external sensor 33 is supplied with electric power from both of the first power source 191 and the second power source 291. One-way communication can be performed from the second control unit 270 to the first control unit 170. Thus, the first control unit 170 can obtain the number of rotations TC1 from the first detection circuit 130, and can obtain the number of rotations TC2 from the second detection circuit 230 via communication from the second control unit 270. The first control unit 170 can obtain the detection value of the steering angle from the external sensor 33, and can store it as the stored value 1. The other configuration is the same as that of the third embodiment, and hence the description is omitted. Also in the modification, the steering angle calculation and the like are performable by the same processing as that of FIG. 12.

In the modification, in the process regarding step S302, the number of rotations TC1 is a parameter obtained from the first detection circuit 130 by the power supply from the first power source 191, and the number of rotations TC2 is a parameter obtained from the second detection circuit by the power supply from the second power source 291. Therefore, the number of rotations TC1 and the number of rotations TC2 correspond to parameters obtained by power supply from different power supply paths.

Fourth Embodiment

Figure 14:
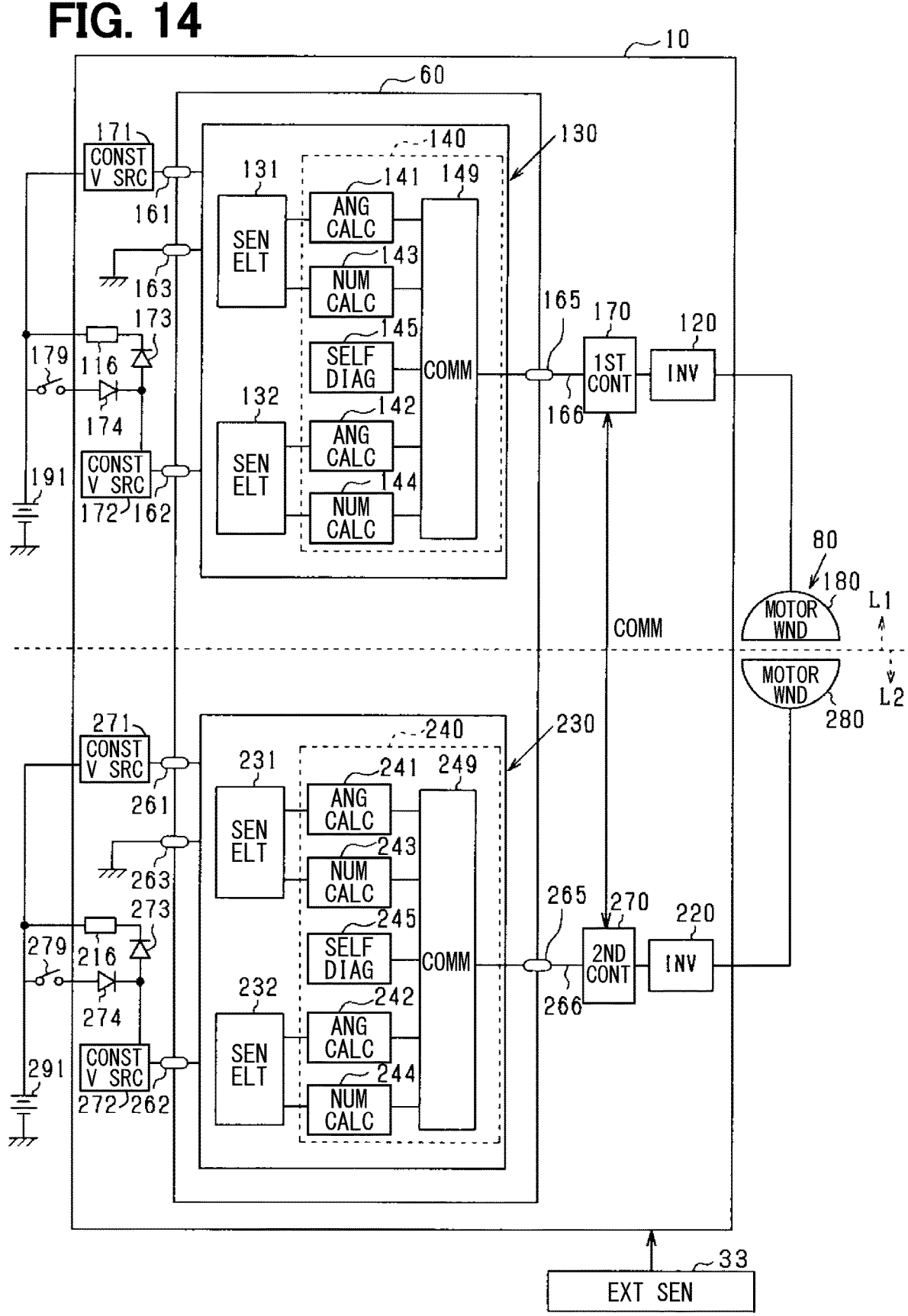
FIG. 14 is a block diagram of an electric machine control unit according to a fourth embodiment of the present disclosure.

As shown in FIG. 14, in the fourth embodiment, number calculators 144 and 244 are provided for the sensor elements 132 and 232, just like the number calculators 143 and 243 are provided for the sensor elements 131 and 231. In the first system L1, a number of rotations TC11 detected by the sensor element 131 and a number of rotations TC12 detected by the sensor element 132 can be obtained. In the second system L2, a number of rotations TC21 detected by the sensor element 231 and a number of rotations TC22 detected by the sensor element 232 can be obtained. The other configuration is the same as that of FIG. 10 according to the third embodiment, and thus the description thereof is omitted.

Figure 15:
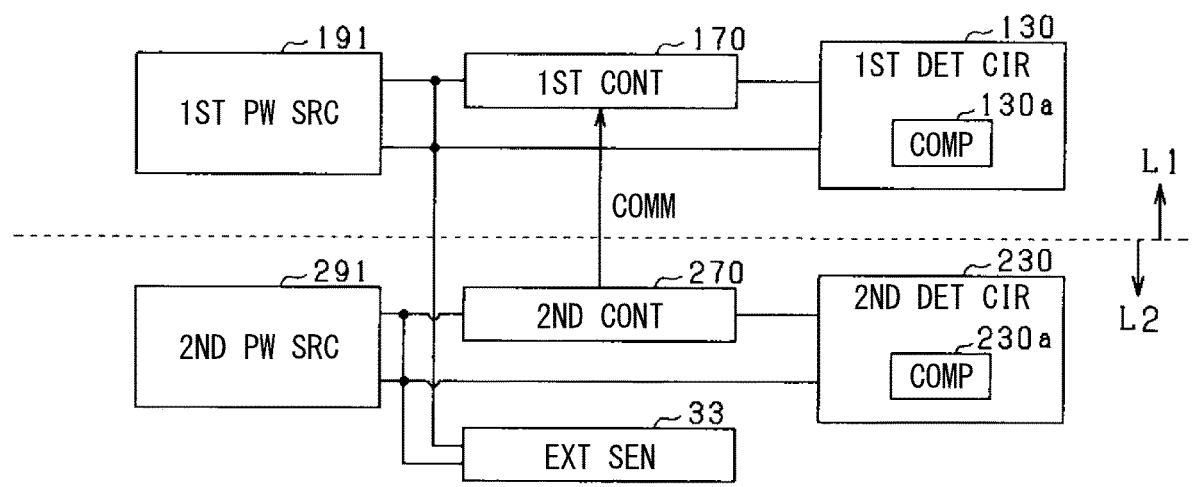
FIG. 15 is a diagram schematically showing the power supply path and the communication path in the control unit according to the fourth embodiment of the present disclosure.

As shown in FIG. 15, the first detection circuit 130 includes a comparator 130*a*, which compares the number of rotations TC11 with the number of rotations TC12 and sets the number of rotations TC11 to the number of rotations TC1 when the difference between TC11 and TC12 does not exceed a predetermined fifth threshold value. The second detection circuit 230 includes a comparator 230*a*, which compares the number of rotations TC21 with the number of rotations TC22 and sets the number of rotations TC21 to the number of rotations TC2 when the difference therebetween does not exceed a predetermined fifth threshold value. The first power source 191, the first control unit 170, and the first detection circuit 130 that constitute the first system L1 are electrically connected to each other. The second power source 291, the second control unit 270 and the second detection circuit 230 constituting the second system L2 are electrically connected to each other. The external sensor 33 is installed outside the ECU 10 independently of any of the first system L1 and the second system L2. The external sensor 33 is electrically connected to the first power source 191, the first control unit 170, the first detection circuit 130, the second power source 291, the second control unit 270, and the second detection circuit 230, respectively.

One-way communication can be performed from the second control unit 270 to the first control unit 170. Thus, the first control unit 170 can obtain the number of rotations TC1 from the first detection circuit 130, and can also obtain the number of rotations TC2 from the second detection circuit 230 via communication from the second control unit 270. The first control unit 170 can obtain the detection value of the steering angle from the external sensor 33, and can store it as the stored value 1. The other configuration is the same as that of the third embodiment, and hence the description is omitted.

Figure 16:
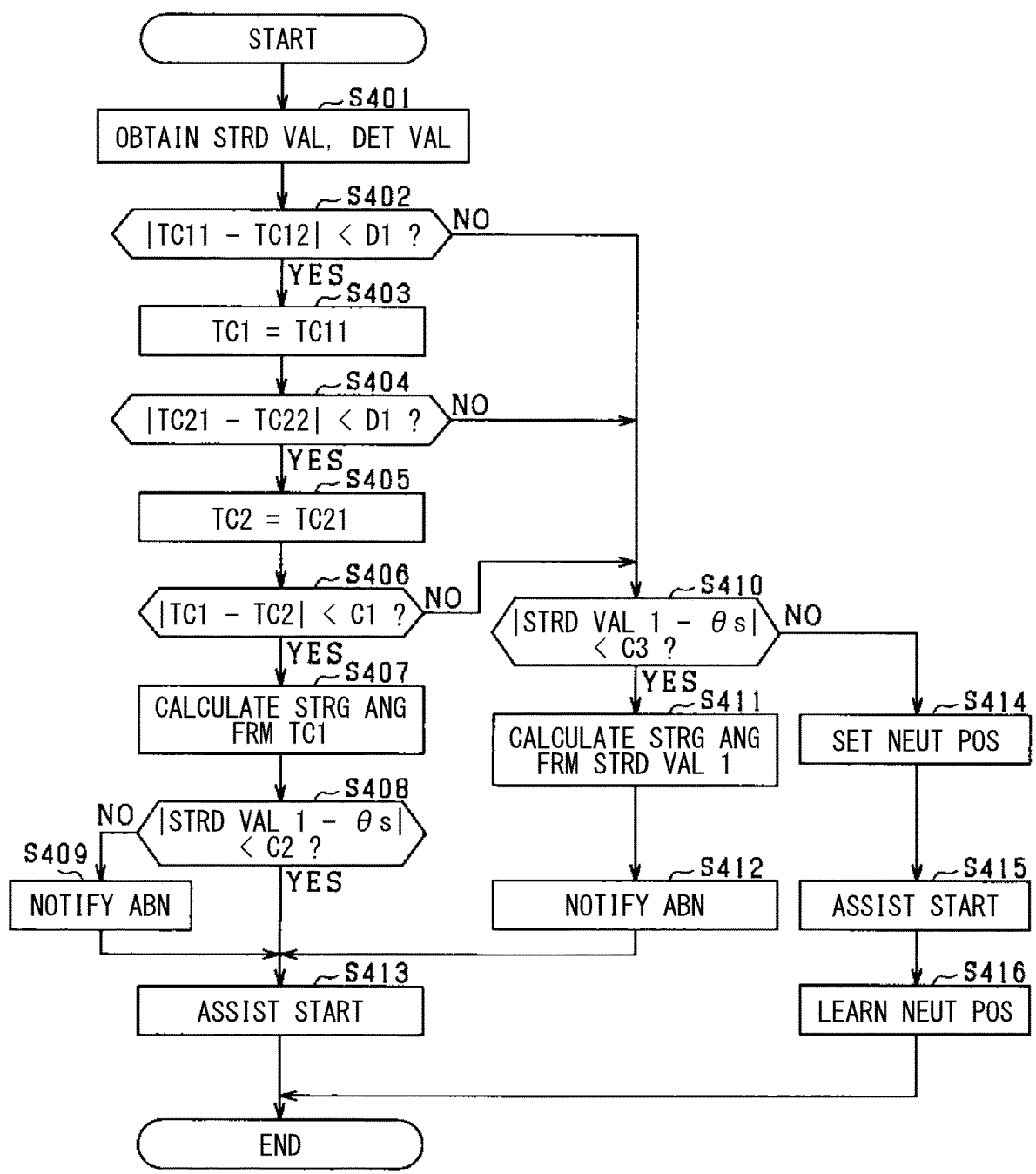
FIG. 16 is a flowchart of steer angle calculation processing according to the fourth embodiment of the present disclosure.

FIG. 16 shows, in the present embodiment, a flowchart of the steer angle calculation process performed by the first control unit 170 when the motor 80 is started.

First, in step S401, the stored value 1 is obtained, and the numbers of rotations TC11 and TC12 of the motor 80 are obtained from the first detection circuit 130, and the numbers of rotations TC21 and TC22 of the motor 80 are obtained from the second detection circuit 230. The steering angle θs obtained from the external sensor 33 when the motor 80 is stopped immediately before is stored in the first control unit 170 as the stored value 1. Thereafter, the process proceeds to step S402.

In step S402, it is determined whether the difference between the number of rotations TC11 and the number of rotations TC12 is smaller than a predetermined value D1. More specifically, if |TC11−TC12|<D1, the number of rotations TC11 is determined as normal, and the process proceeds to step S403. If |TC11−TC12|≥D1, the process proceeds to step S410.

After setting TC1=TC11 in step S403, the process proceeds to step S404. In step S404, it is determined whether the difference between the number of rotations TC21 and the number of rotations TC22 is smaller than a predetermined value D2. More specifically, if |TC21−TC22|<D2, it is determined that the number of rotations TC21 is normal, and the process proceeds to step S405. If |TC21−TC22|≥D2, the process proceeds to step S410.

Note that the predetermined values D1 and D2 correspond to a so-called fifth threshold value, for example, and are set to values within a "normal" range based on the history of the rotation detection values obtained by the first detection circuit 130 and the second detection circuit 230 when the motor 80 is started in the past. Further, the predetermined value D2 may be set to the same value as the predetermined value D1.

After setting TC2=TC21 in step S405, the process proceeds to step S406. The processing according to steps S406 to S416 is the same as steps S302 to S308 and S310 to S313 shown in FIG. 12.

As described above, according to the fourth embodiment, the first detection circuit 130 can obtain the number of rotations TC11 and TC12 from the sensor elements 131 and 132, and can set the number of rotations TC1 based on the comparison between the number of rotations TC11 and the number of rotations TC12. Therefore, the accuracy of the number of rotations TC1 is improved. Similarly, the second detection circuit 230 can obtain the number of rotations TC21 and TC22 from the sensor elements 231 and 232, and can set the number of rotations TC2 based on the comparison between the number of rotations TC21 and the number of rotations TC22. Therefore, the accuracy of the number of rotations TC2 is improved. As a result, the steer angle calculation can be performed with high accuracy, and the steer angle calculation process can be made redundant, and the reliability of the steering system 90 can be further improved.

Note that the technique for setting the number of rotations TC1 from the number of rotations TC11 and TC12 described in the fourth embodiment and the technique for setting the number of rotations TC2 from the number of rotations TC21 and TC22 are, apparently, not only applicable to the third embodiment, but are also applicable to other embodiments, such as the first, second embodiments and their modifications. Then, as a result, the steer angle calculation can be performed with high accuracy, and the steer angle calculation process can be made redundant, and the effect of further improving the reliability of the steering system 90 can be obtained.

According to each of the above embodiments, the following effects can be obtained.

In the steering system 90, the drive device 40 includes, as the first system L1, the first detection circuit 130 that calculates the rotation detection value of the motor 80, and the first power source 191 as a source of electric power. Further, as the second system L2, the drive device 40 includes the second detection circuit 230 that calculates the rotation detection value of the motor 80, and the second power source 291 as a source of electric power. The ECU 10 as an electric power controller includes the storage unit 11, the abnormality determiner 12, and the steer angle calculator 13. The storage unit 11 stores the steer angle information regarding the steering angle of the steering shaft 92 serving as the steering mechanism when the steering mechanism and the steered mechanism stop. The abnormality determiner 12 determines abnormality of the first detection circuit 130 and the second detection circuit 230 and abnormality of the rotation detection values detected thereby (i.e., by the first detection circuit 130 and the second detection circuit 230) by comparing at least two parameters obtained by power supply from different power supply paths, from among (i.e., by selecting them from) the parameters including (i) the plurality of rotation detection values obtained from the first detection circuit 130 and the second detection circuit 230 when the motor 80 is started (i.e., at the start time of the motor 80), and (ii) the steer angle information (e.g., the rotation detection value and the steer angle detection value at the start time of the motor 80 in the past) stored in the storage unit 11 at the stop time of the motor 80 immediately before the start time of the motor 80 described above. Among the parameters including the rotation detection value by the detection circuits in each system (i.e., respective systems) and the stored steer angle information, the parameters obtained by having the respectively different power supply paths are compared, for avoiding a false abnormality determination due to having the same power supply path that causes single abnormality for two, compared parameters. In such manner, accuracy of abnormality determination is secured for reliable determination, since abnormality of each of the detection circuits is determinable.

Further, the steer angle calculator 13 calculates the steering angle based on the parameters (i.e., the rotation detection value or the steer angle information) not determined as abnormal by the abnormality determiner 12 among the plurality of rotation detection values and the steer angle information. Therefore, calculation of the steering angle is performed with high accuracy based on the rotation detection value of the detection circuit that is not determined as abnormal, and the steer angle calculation process is made redundant. Since the accuracy of the abnormality determination and the redundancy in the steer angle calculation can both be improved, the reliability of the steering system 90 can be improved.

Further, in the steering system 90, the steer angle calculator 13 calculates the steering angle by adopting the plurality of rotation detection values with priority over the steer angle information. By prioritizing the rotation detection value that more correctly reflects a current drive state of the motor 80 in the calculation, the calculation accuracy of the steering angle is secured.

In order to compare the at least two parameters obtained by power supply from different power supply paths and to determine abnormality, the steering system 90 may be configured as follows, for example. The plurality of subsystems each include a subsystem-specific control unit (e.g., the first control unit 170 and the second control unit 270) provided individually in a subject subsystem and receiving a supply of electric power from the power source provided in the subject subsystem, and the detection circuit (e.g., the first detection circuit 130) of the subject subsystem may be configured to receive a supply of electric power from the power source (e.g., the first power source 191) provided in the subject subsystem. In this case, the storage unit 11 in each of the individual control unit is configured to store a plurality of rotation detection values (e.g., the number of rotations TC1 and TC2) obtained from the detection circuit of the subject subsystem as the steer angle information. Then, when the motor 80 is started, the abnormality determiner 12 may compare the rotation detection value obtained in one of two subsystems selected from among the plurality of subsystems with the steer angle information read in the other of two selected subsystems, and, when the difference is equal to or greater than a predetermined first threshold value, the detection circuit and the rotation detection value in the rotation-detection-value obtained subsystem may be determined as abnormal. By devising such a configuration, comparison between the rotation detection value and the steer angle information (i.e., the stored value of the rotation detection value) respectively obtained from the detection circuit and the individual control unit respectively having the different power sources provided in different subsystems is enabled for abnormality determination.

Alternatively, for abnormality determination by comparison of at least two parameters having different power supply paths, the steering system 90 may be configured as follows. The plurality of subsystems each may include a subsystem-specific control unit (e.g., the first control unit 170 and the second control unit 270) provided individually in a subject subsystem and receiving a supply of electric power from the power source provided in the subject subsystem, and the detection circuit (e.g., the first detection circuit 130) in the subject subsystem may receive a supply of electric power from a power source in the subject subsystem and from a power source in the other subsystem (e.g., the first power source 191 and the second power source 291). In this case, the storage unit 11 in each of the individual control unit may be configured to store the rotation detection value obtained from the detection circuit of the subject subsystem as the steer angle information. Further, when the motor 80 is started, the abnormality determiner 12 compares the rotation detection value obtained in one of two subsystems selected from among the plurality of subsystems with the steer angle information read in the other of the two selected subsystems, and, when the difference therebetween is equal to or greater than a predetermined second threshold value, the detection circuit and the rotation detection value in the rotation-detection-value obtained subsystem may be determined as abnormal. By devising such a configuration, (i) the rotation detection value obtained from the detection circuit that receives a supply of electric power from the power sources provided in the plurality of subsystems and (ii) the steer angle information (i.e., the stored value of the rotation detection value) read by the individual control unit receiving a supply of electric power from the power source provided in the subject subsystem are compared, for abnormality determination.

Alternatively, for abnormality determination by comparison of at least two parameters having different power supply paths, the steering system 90 may be configured as follows. The steering system 90 may include a steer angle sensor (i.e., an external sensor 33) capable of detecting a steer angle (i.e., a steering angle, or a turning angle) in at least one of the steering mechanism and the steered mechanism driven by the motor 80. Note that the steer angle of the steering mechanism can be detected by a steering angle sensor. The steer angle (i.e., the turning angle) of the steered mechanism can be detected by a turning angle sensor such as a rack stroke sensor. In this case, the plurality of subsystems each include a subsystem-specific, individual control unit (e.g., the first control unit 170 and the second control unit 270) which is, respectively, a control unit individually provided for each subsystem, and the steer angle sensor in each subsystem may be configured, preferably, to receive a supply of electric power from a power supply path that is different from a power supply path of at least one of the detection circuit and the individual control unit in each subsystem.

Further, the storage unit 11 may be configured to store the steer angle detection value detected by the steer angle sensor (e.g., the external sensor 33) as the steer angle information. Further, when the motor 80 is started, the abnormality determiner 12 may be configured to determine abnormality of each of the parameters by comparing at least two parameters having a supply of electric power from different power supply paths, from among the parameters including the rotation detection value, the steer angle information, and the steer angle detection value obtained from the steer angle sensor.

More specifically, for example, in each of the plurality of systems, the control unit may receive a supply of electric power from the power source of the subject system and the steer angle sensor may receive a supply of electric power from the power source of the subject system and the power source of the other system. In this case, when the motor 80 is started, the abnormality determiner 12 compares the steer angle detection value obtained from the steer angle sensor with the steer angle information (e.g., the stored value 1) read by the individual control unit, and, when the difference therebetween is equal to or greater than a predetermined fourth threshold value, the steer angle sensor and the steer angle detection value may be determined as abnormal. By devising such a configuration, the steer angle detection value obtained from the steer angle sensor receiving a supply of electric power from the power sources provided in the plurality of systems and the steer angle information (i.e., the stored value of the steer angle detection value) read by the individual control unit receiving a supply of electric power from the power source provided in the subject system are compared for abnormality determination.

Each of the plurality of systems may be configured to include a plurality of angle sensors, including a main sensor (i.e., the sensor elements 131 and 231) and a sub sensor (i.e., the sensor elements 132 and 232). In this case, when the difference between the rotation detection value of the main sensor and the rotation detection value of the sub sensor exceeds a predetermined fifth threshold value, the abnormality determiner 12 may determine that at least one of the main sensor and the sub sensor is abnormal. In such a configuration, since abnormality of the main sensor can be detected from the rotation detection values detected by both of the main sensor and the sub sensor in the same system, the reliability of the abnormality detection is improved, and, consequently, the reliability of the steer angle calculation is improved. Further, when the difference between the rotation detection value of the main sensor and the rotation detection value of the sub sensor is equal to or less than the fifth threshold value, the rotation detection value of the main sensor may be used as the rotation detection value of the relevant system.

The ECU 10 may be configured to set the initial position of the steering mechanism to the neutral position of the steering mechanism when the abnormality determiner determines that the parameters (i.e., the rotation detection value, the steer angle detection value) for calculating the steering angle of the steering mechanism are abnormal. Further, when setting of the neutral position is performed by the ECU 10, it may be configured that the driver or the like is notified that the neutral position setting is to be performed. The notification of the neutral position setting may be displayed visually on a speedometer or the like, or may be audibly notified by voice or notification sound.

(Modification)

In each of the above-described embodiments, the steering system 90 has been described as an example of the "column assist type." However, the present disclosure is not limited to such a configuration. For example, the steering system 90 may be another type, such as a "rack assist type" which transmits the rotation of the motor 80 to the rack shaft 97.

Figure 17:
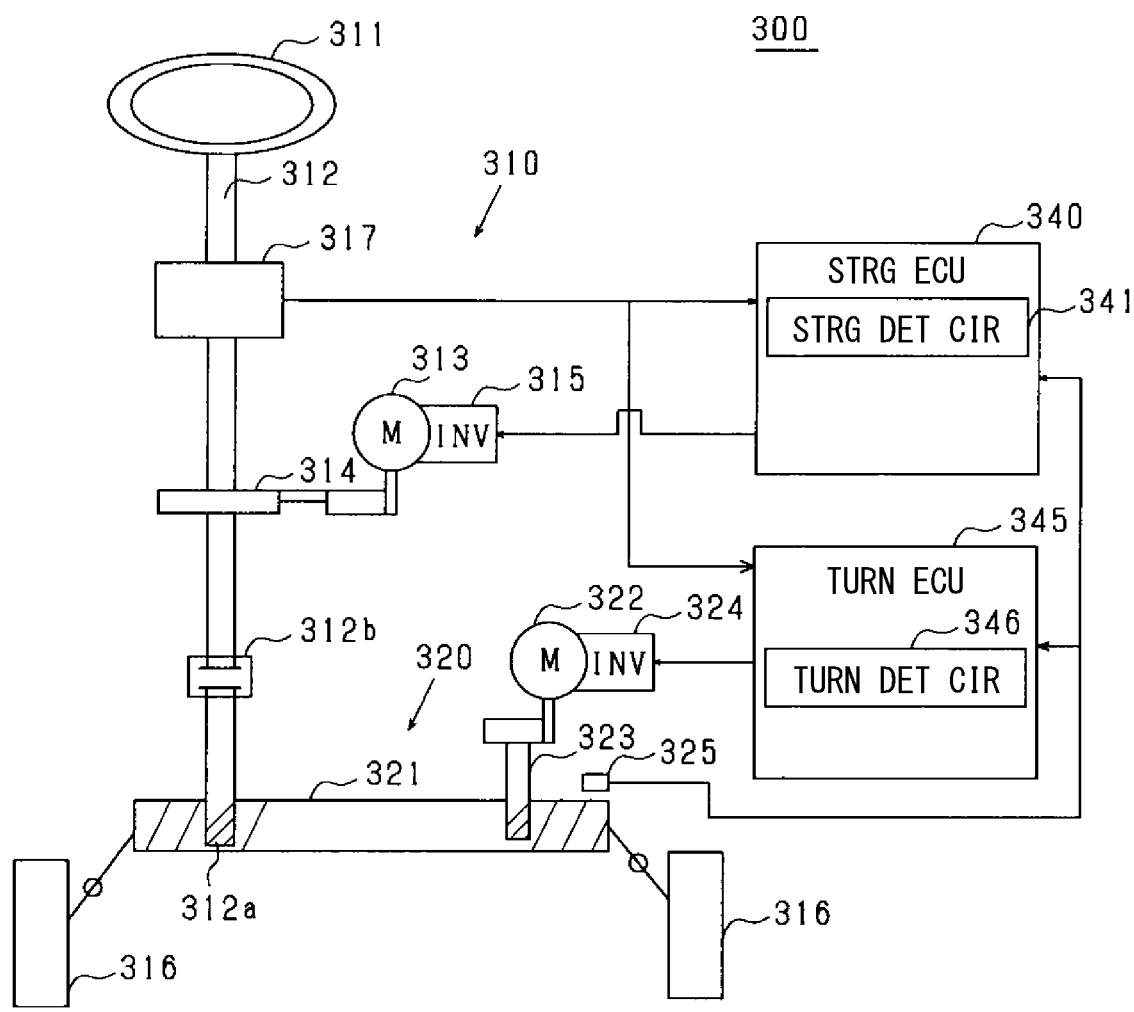
FIG. 17 is a schematic configuration diagram of the steering system according to a modification.

Further, as shown in FIG. 17, the steering system may include both of a motor for driving the steering mechanism and a motor for driving the steered mechanism. The abnormality determination process and the steer angle calculation process can be performable on a motor that drives the steered mechanism, just like the case described in each of the above embodiments. In addition, as a steer angle sensor (i.e., the external sensor 33) used to detect a turning angle, a sensor such as a rack stroke sensor capable of detecting a turning angle can be usable.

A steering system 300 shown in FIG. 17 is a so-called steer-by-wire steering system. The steering system 300 includes a steering device 310 that receives a driver's steering operation, and a turning device 320 that turns wheels 316 according to the amount of steering operation received by the steering device 310. In the steering system of the steer-by-wire type, the term "steering force" may alternatively be designated as a term "reaction force."

The steering device 310 includes a steering wheel 311 which rotates in response to a driver's operation, a steering shaft 312 which rotates with the rotation of the steering wheel 311, and a steering motor 313. The steering motor 313 is connected to the steering shaft 312 via a steering speed reducer 314, and provides steering (i.e., a reaction force) according to the driver's operation of the steering wheel 311. The steering motor 313 is an alternating current (AC) motor that is rotationally driven by an AC electric power. Further, the steering motor 313 is connected to a power source via an inverter 315. The inverter 315 converts a direct current (DC) electric power from the power source into the AC electric power, and supplies electric power to the steering motor 313.

A pinion shaft 312a is provided on the tip end of the steering shaft 312 via a clutch 312b. During a normal operation of the vehicle, the clutch 312b is in an open state, and the rotation of the steering shaft 312 is not transmitted to the pinion shaft 312a. For example, when the clutch 312b is closed due to an abnormality or the like of the steering system 300, the rotation of the steering shaft 312 is transmitted to the pinion shaft 312a.

The turning device 320 includes a rack shaft 321 that changes the direction of the wheels 316, and a turning motor 322. The wheels 316 are connected to both ends of the rack shaft 321 via tie rods. The turning motor 322 is connected to the rack shaft 321 via a turning speed reducer 323, and applies a steering force that is a force to change the direction of the wheel 316 to the rack shaft 321. The turning motor 322 is connected to a power source via an inverter 324. The inverter 324 converts the DC electric power from the power source into the AC electric power, and supplies electric power to the turning motor 322.

The pinion shaft 312a engages with the rack shaft 321, and when the clutch 312b is in the open state, the steering shaft 312 is not mechanically connected to the rack shaft 321. Therefore, the rotation of the steering shaft 312 accompanying the driver's operation of the steering wheel 311 is not converted into the linear movement of the rack shaft 321. On the other hand, in the closed state of the clutch 312b, the steering shaft 312 is mechanically connected to the rack shaft 321. Therefore, the rotational movement of the steering shaft 312 accompanying the driver's operation of the steering wheel 311 is converted into the linear movement of the rack shaft 321.

The steering shaft 312 of the steering device 310 is provided with a torque sensor 317 that detects a steering torque according to the driver's steering operation. Further, on the rack shaft 321 of the turning device 320, a rack stroke sensor 325 which detects a displacement amount X indicative of a linear movement amount of the rack shaft 321 is provided.

The steering system 300 includes a steering ECU 340 as a steering control unit and a turning ECU 345 as a turning control unit. The steering ECU 340 and the turning ECU 345 respectively include a central processing unit (CPU) and a memory (e.g., ROM, RAM), and the CPU executes a program stored in the memory to control a supply of electric power to the steering motor 313 and the turning motor 322.

The steering ECU 340 calculates steering torque instruction value which is an instruction value of a torque to the steering motor 313, based on a steering absolute angle Y1 indicating the rotation amount (i.e., an absolute angle) of the steering shaft 312 accompanying the driver's steering operation, the steering torque Th and the vehicle speed Vc. Further, based on the steering torque instruction value, an operation signal for operating the inverter 315 is calculated. The absolute angle Y1 described above is a value that indicates a rotation angle of the steering wheel 311, from its neutral position to a right or left limit, corresponding to the turning of the wheel 316 turned from a straight travel position either to a left or right turning limit angle.

The steering ECU 340 includes, as a rotation detection circuit, a steering detection circuit 341 that calculates the steering absolute angle Y1 based on a detection value indicating a rotation state of the steering motor 313. The steering detection circuit 341 calculates, as detection values, the rotation angle θm of the steering motor 313 and the number of rotations TC indicating the number of rotations of the steering motor 313, counted by a unit of a predetermined angle. For example, the steering motor 313 is provided with a magnet that rotates integrally with a rotor or a rotation shaft, and the steering detection circuit 341 calculates the rotation angle θm and the number of rotations TC by detecting the change of the magnetic field due to the rotation of the magnet. The steering ECU 340 can be configured to connect to the power source via the power supply path and the communication path similar to the ones described in the above embodiments, for performing similar processing.

The turning ECU 345 calculates, as an instruction value of a torque for the turning motor 322, a turning torque instruction value based on a steering absolute angle Y2 indicating the rotation amount (i.e., an absolute angle) of the steering shaft 312, the displacement amount X, the steering torque Th, and the vehicle speed Vc. Then, based on the turning torque instruction value, an operation signal for operating the inverter 324 is calculated.

The turning ECU 345 includes, as a rotation detection circuit, a turning detection circuit 346 that calculates a turning absolute angle Y2 based on a detection value indicating a rotation state of the turning motor 322. The turning detection circuit 346 calculates, as detection values, a rotation angle θm of the turning motor 322 and a number of rotations TC indicating the number of rotations of the turning motor 322 by a unit of a predetermined angle. For example, the turning motor 322 is provided with a magnet that rotates integrally with the rotor or the rotation shaft, and the turning detection circuit 346 calculates the rotation angle θm and the number of rotations TC of the turning motor 322, by detecting a change in the magnetic field caused by the rotation of the magnet.

The steering ECU 340 and the turning ECU 345 can be configured to have two systems, similarly to the ECU 10 of the steering device 8 in the above embodiments. The configurations shown in FIGS. 4, 5, 8, 10, 11, 13 to 15 may be applicable to the steering ECU 340 and the steering ECU 345, by reading the motor 80 as the steering motor 313 or the turning motor 322 and reading the ECU 10 as the steering ECU 340 or the steering ECU 345. Since the steering ECU 340 is the same as the above-described embodiments and modification, the following description focuses on the turning ECU 345 about differences from the above-described embodiments and modification.

When applying the configuration of the steering device 8 according to the above-described embodiment to the turning ECU 345, the external sensor 33 in FIGS. 10, 11, 13 to 15 is a turning angle sensor such as the rack stroke sensor 325 or the like. Further, in the processing of FIGS. 12 and 16, by using the turning angle θr instead of the steering angle θs, a calculation process of the turning angle or the like is performed, for the assist operation of the turning motor 322.

Further, in the steer angle calculation process regarding the turning ECU 345, the "steering angle" in FIG. 7, 9, 12, 16 may be replaced with the "turning angle" for performing the process. Note that the processing in steps S111 to S113 shown in FIG. 7, steps S211 to S213 in FIG. 9, steps S311 to S313 in FIG. 12, and steps S414 to S416 in FIG. 16 is different from the processing regarding the steering mechanism.

In the neutral position setting in step S111, the neutral position setting of the steered mechanism is performed. More specifically, for example, after notifying a driver or a mechanic by a meter etc., the rack shaft 321 is displaced from one rack end to the other rack end by the turning motor 322 to search for a neutral position, and the searched position may be set as a neutral position. Alternatively, after prompting a driver, a mechanic or the like to perform an operation of the steering wheel by a meter or the like, the neutral position may be searched for and set by the operation of the steering wheel by the driver, the mechanic or the like. Alternatively, after prompting the driver, the mechanic or the like to perform the neutral position setting by a meter or the like, the driver, the mechanic or the like may confirm the turning angle of the steered mechanism from outside of the vehicle, and the neutral position may be set based on such confirmed turning angle. In addition, after sending an instruction for starting setting of the neutral position from a service tool of the vehicle maintenance or the like, the steering wheel 91 may be operated by the driver, the mechanic, or the like to set the neutral position. Furthermore, it may be preferable that an instruction or an operation relating to the neutral position setting be provided with a failsafe function, allowing the neutral position setting only during a vehicle stop time, for example.

As described above, also in the steering system 300 in which the steering shaft 312 which is a steering mechanism is driven by the steering motor 313 and the rack shaft 321 which is a steered mechanism is driven by the turning motor 322, the steering ECU 340 controlling the steering motor 313 may be configured to have functions related to the storage unit 11, the abnormality determiner 12, the steer angle calculator 13, and the motor control unit 14. Similarly, the turning ECU 345 that controls the turning motor 322 may be configured to have functions related to the storage unit 11, the abnormality determiner 12, the steer angle calculator 13, and the motor control unit 14.

The storage unit 11 stores the steer angle information on the steering angle of the steering shaft 312 which is a steering mechanism driven by the steering motor 313, and the steer angle information on the turning angle of the rack shaft 321 which is a steered mechanism driven by the turning motor 322.

The abnormality determiner 12 determines abnormality of the detection circuits 130 and 230 included in different subsystems based on (i) the plurality of rotation detection values calculated by the detection circuits 130 and 230 based on the detection values of the sensor elements 131, 132, 231, and 232 when the steering motor 313 or the turning motor 322 is started and (ii) the steer angle information (e.g., detection values of the detection circuits 130 and 230 in the past and detection values of the external sensor 33) stored in the storage unit 11. Therefore, the abnormality determination can be performed more reliably.

Further, the steer angle calculator 13 calculates the steer angle based on the parameters (i.e., the rotation detection value or the steer angle information) not determined as abnormal by the abnormality determiner 12 from among the plurality of rotation detection values and the steer angle information. Therefore, the steer angle can be calculated with high accuracy based on the rotation detection value of the detection circuit not determined as abnormal. Further, even when all the detection circuits are determined as abnormal, the steering angle is calculable based on the stored steer angle information.

Further, in the steering ECU 340, the motor control unit 14 calculates the steering torque instruction value, which is an instruction value of a torque to the steering motor 313 based on the steering absolute angle Y1 indicating the amount of rotation (i.e., an absolute angle) of the steering shaft 312 accompanying the driver's steering operation, the steering torque Th and the vehicle speed Vc. The steering angle calculated by the steer angle calculator 13 is used as the steering absolute angle Y1. Further, based on the steering torque instruction value, an operation signal for operating the inverter 315 is calculated.

Further, in the turning ECU 345, the motor control unit 14 calculates, as an instruction value of a torque for the turning motor 322, the turning torque instruction value based on the steering absolute angle Y2 indicating the rotation amount (i.e., an absolute angle) of the steering shaft 312, the displacement amount X, the steering torque Th, and the vehicle speed Vc. Then, based on the turning torque instruction value, the operation signal for operating the inverter 324 is calculated.

As described above, in the steering system 300 according to the modification, the first detection circuit 130 that calculates the rotation detection value of the motors 313 and 322 and the first power source 191 as a power source are provided in each of the steering motor 313 and the turning motor 322, as the first system L1. In addition, as the second system L2, the second detection circuit 230 that calculates the rotation detection value of the motors 313 and 322, and the second power source 291 as a power source are provided. Each of the steering ECU 340 and the turning ECU 345 as the control unit includes the storage unit 11, the abnormality determiner 12, and the steer angle calculator 13. The storage unit 11 stores the steer angle information on the steering angle of the steering shaft 92 as the steering mechanism and the turning angle of the rack shaft 321 as the steered mechanism when the steering mechanism and the steered mechanism stop. The abnormality determiner 12 detects abnormality of the first detection circuit 130 and the second detection circuit 230 based on (i) the plurality of rotation detection values obtained from the first detection circuit 130 and the second detection circuit 230 at the start time of the respective motors (i.e., the steering motor 313 and the turning motor 322), and (ii) the steer angle information stored in the storage unit 11 at the stop time of the respective motors immediately before the start time. Since the abnormality of each detection circuit is determined using the rotation detection value by the detection circuit in each system and the stored steer angle information, the abnormality determination can be performed more reliably.

Further, the steer angle calculator 13 calculates the steering angle or the turning angle based on the parameters (i.e., the rotation detection value or the steer angle information) not determined as abnormal by the abnormality determiner 12, from among the plurality of rotation detection values and the steer angle information. Therefore, the steering angle or the turning angle can be calculated with high accuracy based on the rotation detection value of the detection circuit which is not determined as abnormal, and the steer angle calculation process is made redundant to improve the reliability of the steering system 90.

It is not necessary for both of the drive system of the steering motor 313 and the drive system of the turning motor 322 to have a plurality of systems such as the first system L1 and the second system L2, that is, either (i.e., only one) of which may be configured to include multiple systems. In addition, although an example where the storage unit 11, the abnormality determiner 12, the steer angle calculator 13 and the like are provided in both of the steering ECU 340 and the turning ECU 345 has been described, it is not limited to such a configuration. For example, the storage unit 11, the abnormality determiner 12, the steer angle calculator 13 and the like may be provided in a separate ECU independent of the steering ECU 340 and the turning ECU 345.

What is claimed is:

1. A steering system of a vehicle, comprising:
a steering mechanism;
a steered mechanism;
a motor configured to drive at least one of the steering mechanism or the steered mechanism; and
a control unit configured to control the motor, wherein
a plurality of subsystems provided in the steering system each include (i) a detection circuit configured to calculate a rotation detection value of the motor based on an angle sensor detecting a rotation of the motor and (ii) a power supply path configured to supply electric power from a power source to the detection circuit, and wherein
the control unit includes:
a storage unit configured to store steer angle information regarding a steering angle of the steering mechanism and/or a turning angle of the steered mechanism driven by the motor when the steering mechanism and the steered mechanism stop;
an abnormality determiner configured to determine, at a start time of the motor operation, abnormality of the rotation detection value and the detection circuit in the plurality of subsystems based on a comparison of at least two parameters among parameters including (i) a plurality of the rotation detection values respectively obtained from the detection circuits in the plurality of subsystems and (ii) the steer angle information stored in the storage unit, the at least two parameters subject to comparison respectively being a parameter obtained by using a supply of electric power from a different power supply path; and
a steer angle calculator configured to calculate the steer angle based on the parameters having been determined by the abnormality determiner as not having abnormality among the parameters including the plurality of rotation detection values and the steer angle information stored in the storage unit.

2. The steering system of claim 1, wherein
the steering angle calculator calculates the steering angle by prioritizing the plurality of rotation detection values rather than the steer angle information.

3. The steering system of claim 1, wherein
the plurality of subsystems each include a subsystem-specific control unit that receives a supply of the electric power from the power source provided in a subject subsystem,
the detection circuit in the subject subsystem receives a supply of electric power from the power source via the power supply path provided in the subject subsystem,
the storage unit stores, as the steer angle information, the rotation detection value obtained from the detection circuit in the subject subsystem at a stop time of the steering mechanism and the steered mechanism, and
when the rotation detection value of one subsystem and the steer angle information of an other subsystem are compared and a difference therebetween is equal to or greater than a first threshold value at the start time of the motor, the abnormality determiner determines that the detection circuit and the rotation detection value of the subsystem from which the rotation detection value is obtained are abnormal.

4. The steering system of claim 1, wherein
the plurality of subsystems each include a subsystem-specific, individual control unit that receives a supply of the electric power from the power source provided in a subject subsystem,
the detection circuit in the subject subsystem receives a supply of electric power from the power source provided in the subject subsystem via one power supply path and from the power source provided in an other subsystem via a different power supply path,
the storage unit stores, as the steer angle information, the rotation detection value obtained from the detection circuit in the subject subsystem at a stop time of the steering mechanism and the steered mechanism, and
when the rotation detection value of the target subsystem and the steer angle information of the other subsystem are compared and a difference therebetween is equal to or greater than a second threshold value at the start time of the motor, the abnormality determiner determines that the detection circuit and the rotation detection value of the subsystem from which the rotation detection value is obtained are abnormal.

5. The steering system of claim 1, wherein
the steering system includes a steering angle sensor capable of detecting the steering angle of at least one of the steering mechanism and the steered mechanism that is driven by the motor,
the plurality of subsystems each include a subsystem-specific, individual control unit,
the steering angle sensor receives a supply of electric power via a power supply path that is different from the power supply path of at least one of the detection circuit and the individual control unit,
the storage unit stores, as the steer angle information, a steering angle detection value detected by the steering angle sensor at a stop time of the steering mechanism and the steered mechanism, and
based on a comparison of at least two parameters from among parameters including the rotation detection value, the steer angle information, and the steer angle detection value obtained from the steer angle sensor at the start time of the motor, the at least two parameters each having been obtained by receiving a supply of the electric power from different electric power supply path, the abnormality determiner determines the abnormality of each parameter.

6. The steering system of claim 1, wherein
the plurality of subsystems each include a plurality of angle sensors including a main sensor and a sub sensor, and
the abnormality determiner determines that at least one of the main sensor and the sub sensor is abnormal when a difference between the rotation detection value of the main sensor and the rotation detection value of the sub sensor exceeds a preset fifth threshold value.

7. The steering system of claim 1, wherein
the control unit sets an initial position of the steering mechanism for a straight travel of the vehicle as a neutral position of the steering mechanism when the parameter for a calculation of the steering angle of the steering mechanism is determined as abnormal by the abnormality determiner.

8. The steering system of claim 1, wherein
the control unit notifies a neutral position setting of the steered mechanism or performs the neutral position setting of the steered mechanism when the parameter for a calculation of the steer angle of the steered mechanism is determined as abnormal by the abnormality determiner.

* * * * *